(12) United States Patent
Zenni, Jr.

(10) Patent No.: US 8,620,787 B2
(45) Date of Patent: Dec. 31, 2013

(54) PROCESSOR-BASED SYSTEMS AND COMPUTER-IMPLEMENTED METHODS FOR IDENTIFICATION, SOURCING, AND ACQUISITION OF DISTRESSED DEBT

(75) Inventor: James J. Zenni, Jr., Lake Bluff, IL (US)

(73) Assignee: ZAPP Systems, L.L.C., Lake Forest, IL (US)

( * ) Notice: Subject to any disclaimer, the term of this patent is extended or adjusted under 35 U.S.C. 154(b) by 0 days.

(21) Appl. No.: 13/223,873

(22) Filed: Sep. 1, 2011

(65) Prior Publication Data

US 2013/0060668 A1    Mar. 7, 2013

(51) Int. Cl.
*G06Q 40/06* (2012.01)
(52) U.S. Cl.
USPC .............................................. 705/35; 705/38
(58) Field of Classification Search
USPC ..................................................... 705/35, 38
See application file for complete search history.

(56) References Cited

U.S. PATENT DOCUMENTS

2005/0091272 A1 *  4/2005  Smith et al. ............... 707/104.1
2011/0016042 A1 *  1/2011  Cho et al. ....................... 705/38

* cited by examiner

*Primary Examiner* — James A Vezeris
(74) *Attorney, Agent, or Firm* — McDonnell Boehnen Hulbert & Berghoff LLP

(57) ABSTRACT

Disclosed herein are processor-based systems and computer-implemented methods for identification, sourcing, and acquisition of distressed debt. At least one embodiment provides amalgamated debt information associated with an indebted entity, which may owe debt to multiple disparate lending entities. Often, debt information involving these lending entities is maintained in a number of unassociated and disparate data sources, to which access may be restricted on a subscriber basis. To provide amalgamated debt information associated with the indebted entity, a computer platform is programmed to carry out at least one of searching and receiving debt information that is associated with the indebted entity and that identifies some or all of the multiple disparate lending entities. The platform is programmed to amalgamate and organize the debt information, and to present the amalgamated-and-organized debt information via a user interface, providing consolidated access to the unassociated and disparate data sources.

34 Claims, 10 Drawing Sheets

PROCESSOR-BASED SYSTEMS AND COMPUTER-IMPLEMENTED METHODS FOR IDENTIFICATION, SOURCING, AND ACQUISITION OF DISTRESSED DEBT

BACKGROUND

It is often said, perhaps tritely at times, that it takes money to make money. In the business world, when the one or more decision makers at a given company subscribe to this view, and more particularly when they act according to it, that company may borrow money in (or at least as part of) an effort to grow the company, sustain the company, save the company, adapt the company to an ever-changing marketplace, and/or for one or more other reasons.

Typically, such a company will put this into practice by engaging in a business transaction to borrow what most would consider to be a substantial sum of money from an institution such as a large commercial bank (e.g., Bank of America® (currently headquartered in Charlotte, N.C.), JPMorgan Chase® (currently headquartered in New York, N.Y.), Wells Fargo® (currently headquartered in San Francisco, Calif.), GE Capital® (currently headquartered in Stamford, Conn.), CIT Group Inc. (currently headquartered in New York, N.Y.), PNC Financial Services Group, Inc. (currently headquartered in Pittsburgh, Pa.), and the like), though certainly there are types of lending institutions other than large commercial banks.

This type of transaction, where a company borrows money from a bank, is of course quite often characterized as the company taking out a loan from the bank, and is also quite often described as a way in which the company takes on debt. And the more debt a company has on its balance sheet (i.e., owes) at a given time, the more "leveraged" that company is said to be at that time. (Generally speaking, as is known to those in the art, a balance sheet is a comparison (at a given time) of a company's current assets to that same company's current liabilities.)

Now, it is noted that the word "leveraged" is used—in that form and in others close to it (e.g., leverage, leveraging, levered, and so on)—in many ways in many financial contexts. In the context of this written description, a statement of how leveraged a given company (i.e., their balance sheet) is at a given moment (i.e., "snapshot") in time is generally a characterization of how (i) the magnitude of the debt the company currently owes (to, e.g., institutions such as commercial banks) compares with (ii) the magnitude of what is sometimes called the company's "intrinsic value" (which would typically be considered to include assets such as money (i.e., cash) and assets that could (at least in theory) be monetized somewhat readily) at the time that the aforementioned debt is owed.

The term "leveraged" (and its other similar forms) is also used at times in the art and herein as a descriptor not of a given company at a given moment, but as a descriptor of a transaction itself—that is, of the structure of a transaction. Thus, the greater the extent to which, as an example, an acquisition (of, as examples, a company or a piece of real property) was made with borrowed funds, the more "leveraged" that transaction is typically said to have been. So in the business world, when looking at a given whole, whether it be the balance sheet of a company, or the funds used in carrying out a transaction, or some other example, the degree to which that whole is said to be (or to have been) "leveraged" is typically an expression of the degree to which it is (or was) funded by borrowed money (i.e., debt).

Returning the reader's attention for a moment to the above-mentioned notion of a company's "intrinsic value," this concept was roughly defined above as including both the actual money (i.e., cash) that the company has on hand, as well as the value of those of the company's assets that could (at least in theory) be monetized at least somewhat readily. To some extent of course, intrinsic value—and in some sense the broader concept of value in general—is in the eye of the beholder (or in the eye of the analyst(s), as the case may be). But generally speaking, an expression of a company's intrinsic value is an expression of the aggregate actual value of the company's current assets, including of course its value as a going concern (therefore including, e.g., the strength and value of any brand names, and so on).

Another way of characterizing an assessment of the intrinsic value of a company is that it involves setting aside for a moment the fact that the company may have taken on one or more (perhaps significant) debts, and focusing instead on "what's good" about the company at the moment—in other words, focusing on the assets and not on the liabilities. Such assets may include one or more of the examples already given, and may also or instead include factories, equipment, accounts receivable, and/or one or more other types of actual assets.

So, putting some of these concepts together, a statement that a company's balance sheet at a given time is "highly leveraged" is in essence a statement that the company currently owes a lot of money relative to the amount of money (e.g., cash) that the company currently has and could (at least in theory) readily generate by selling everything (other than its cash, of course) that it has and is, including any factories, equipment, intellectual property, etc.

Now, if a company is, for one or more reasons, deemed by one or more people, entities, and/or institutions that are making such an assessment as being sufficiently unlikely to pay off (e.g., sufficiently unlikely to be able to pay off) a given debt the company has taken on, that debt is typically and herein described as being "distressed." That is, that debt is known as "distressed debt," and from the perspective of the original lender—or from the perspective of the current owner of the debt in cases where the current owner is not the original lender—is no longer the asset (i.e., revenue stream of regular payments) it was once thought to be.

As such, it often occurs that, for the right price, the current owner of the benefit of all or part of a borrowing company's obligations of repayment under the terms of a given loan is willing to sell that interest (i.e., transfer to a buyer the benefit of the borrower's obligations in exchange for some consideration (e.g., an agreed-upon sum of money)). In this scenario, the current owner could be the original lender, or could be another institution (a different bank, a hedge fund, etc.) that acquired the benefit of all or part of the borrowing company's obligations, perhaps from the original lender (which may have been a bank, but which could instead have been, as examples, an individual or another type of lending institution) at a time substantially immediately following the execution of the original loan, or perhaps from the original lender or from another "downstream" entity at a later time.

Predictably, a secondary market has developed for the buying and selling of debt, including distressed debt. In some cases, a buyer may believe that a seller is undervaluing such debt, and may therefore believe that the debt could be acquired at what the buyer would consider to be a bargain price. In other cases, a seller may simply believe that a given debt is underperforming as an asset, and simply wish to recover what they can by selling that debt. In still other cases, a buyer may believe that a seller is currently more in need of having cash on hand than of having long-term, annuity-payment-making type assets, and may therefore see an opportunity to create a net positive by paying less (e.g., in a one-time, lump-sum purchase payment) than the buyer believes the revenue stream from the debt will ultimately be worth in the aggregate. And certainly many other reasons exist as to why buyers form and then act on their opinions that acquiring another company's debt would be in their interest.

Now, it often happens that companies, even so-called "good companies" (i.e., those with one or more redeeming characteristics such as well-meaning management, hard-working employees, one or more popular products, a loyal and sizeable customer base, plenty of tangible assets, etc.) find themselves in the unfortunate position of having what some would describe as a "bad balance sheet." That is, such a company may both (a) have assets that, in the aggregate, have a high value (i.e., the company has a solid intrinsic value) and (b) have taken on more—now distressed—debt than it will be able to pay back, perhaps due to one or more runs of bad luck, one or more economic downturns, one or more inaccurate projections, and/or one or more other factors, the possible variety and composition of which are nearly limitless.

Now, it is no secret that, in this world, there are many individuals, families, universities, companies (e.g., insurance companies), endowments, trusts, foundations, pension plans, etc. that have (or at least that have control of) a great deal of private wealth. Naturally, these people, groups, institutions, etc. (hereinafter collectively referred to at times as investors, potential investors, and the like) consider it to be in their interest to invest substantial sums of money in various ways to try to, over time, increase the net worth of their holdings and/or of those they manage. As one would expect, this has created an opportunity for financially savvy individuals to go into the business of investing this private wealth (i.e., "private equity") on behalf of these investors. Firms that conduct this type of investment, exclusively in some cases, are often known—and are referred to herein at times—as "private-equity firms."

OVERVIEW

The management and investment of private equity can of course take on nearly countless forms, some of which involve using that equity to acquire (i.e., buy) distressed debt. In some cases, the investment of private equity in distressed debt is fairly analogous to investing capital in a stock market; put simply, investors try to buy low and sell high.

In other cases, the investment of private equity in distressed debt takes on a more complex form, one that typically must be carried out over a relatively lengthy time frame. This more complex form is often known as "control investing," and in essence involves using the acquisition in the aggregate of a sufficient degree of the distressed debt of a given company to ultimately acquire a controlling stake in that company. And it is noted that there are a number of other ways in which, and strategies according to which, private equity can be invested in distressed debt, many of which fall conceptually on a spectrum between the "simple buy low and sell high" and "control investing" approaches described above.

With respect to the control-investing approach, once the private-equity firm (and perhaps specifically a particular fund that had been established at the firm for engaging in this type of investment) has acquired a sufficient degree of the debt of a particular company, the private-equity firm can then assume a position and posture of great influence in triggering—and later in "sitting at the table" during—the reorganization and restructuring of the previously troubled company, in many cases guiding it through formal bankruptcy proceedings.

Indeed, something that often occurs in this type of situation is that a company whose balance sheet is skewed to a financially unhealthy extent in the direction of having taken on debt will negotiate with the person, group, entity, organization, etc. to which the company owes this debt in order to agree upon terms according to which the debt (or at least a substantial portion thereof) is converted into equity shares of—i.e., an ownership stake in—the company. And this is just one way in which a private-equity firm can transition from having acquired a sufficient amount of the distressed debt of a company to controlling that company.

Thus, if a private-equity firm acquires a sufficient amount of the distressed debt of a company, and then proceeds and negotiates judiciously, the firm can and often does end up owning the company itself (or at least a controlling interest therein), often by essentially "forgiving" the debt in exchange for obtaining the ownership interest. This facilitates taking over management boards, as well as making any number of other strategic and procedural moves that increase the private-equity firm's ability to reshape and restructure the company in a manner that will, the firm hopes, ultimately inure to the benefit of the firm's investors.

Indeed, prominent among the goals of a private-equity firm engaged in "control investing" the private equity of its investors in the distressed debt of various companies is that these companies emerge from the acquisition-and-restructuring process having a market value that is greater (and from the perspective of the private-equity firm, hopefully much greater) than the value of the investment capital that the private-equity firm expended in acquiring (and restructuring) the company. The private-equity firm can then endeavor to sell these revamped and improved companies at a handsome profit.

This overall investment strategy is also referred to at times as "distressed-debt-to-equity investing" due to its potential, as described above, for resulting in the private-equity firm achieving a controlling equity position in the acquired companies. Further with respect to terminology, a given company is often referred to (from the perspective of the private-equity firm) as a "target company" prior to and/or during the process of the private-equity firm acquiring control of that company, and may be referred to (again, from the perspective of the private-equity firm) as a "portfolio company" after such control has been achieved.

Thus, control investing of private equity in distressed debt is, in some ways, still just a "buy low, sell high" proposition, albeit one that takes a significant amount of time as compared with an approach that, for the most part, is centered around the buying and selling of distressed-debt assets that remain fundamentally unchanged between the buy and the sell (other than as to their value, in most cases); the latter approach is focused on buying these assets low and later (hopefully) selling those same assets high, perhaps due to superior value analysis, perhaps due to improving things at the target company in ways that fall short of being a full-on restructuring, and so on. In contrast, the control-investing approach involves buying distressed-debt assets low and later (hopefully) selling the entire company high.

With respect in particular (but not exclusively) to the control-investing type of investment of private equity in distressed debt, a private-equity firm's (or, more generally, a private-equity investor's) position of strength from a bargaining perspective (after having acquired a critical mass of the distressed debt of a target company) comes in large part from the particular type of distressed debt in which the private-equity firm has been able to acquire a significant interest. To with, the more senior and the more valuably secured the acquired debt, the stronger will be the bargaining position of the private-equity firm in being able to trigger—and in participating in—the restructuring and reorganization of the company.

As is known to those in the art, the degree to which a given debt of a company is considered to be "senior" is a characterization of the relative priority (with respect to being repaid) that, in the event of bankruptcy, the given debt will have (as compared with one or more other obligations of the company). The more senior the given debt is, the closer the given debt would be to the front of the line for being repaid during bankruptcy proceedings.

And as is also known to those of skill in the art, debt being "secured" generally means that, if the borrower defaults on the obligation to repay the debt, the lender—or current owner of the borrower's obligations under the terms of the debt (in the event that the benefit of such obligations had been transferred one or more times after the original transaction)—can foreclose on (i.e., start legal proceedings to assert contractual rights to take ownership of) certain property that the borrower agreed at the time of the original transaction to provide (a.k.a. to "put up") as collateral for the loan, mitigating the original risk position of the lender, and likely influencing the substance of the agreed-upon terms of repayment. It is noted that the distressed debt on which the present systems and methods are focused is typically secured by assets of the target company such as plants, factories, equipment, accounts receivable, real property, one or more other types of collateral, and/or some combination of the foregoing.

Thus, as stated above, the more senior and the more secured the debt (of the target company) that has been acquired to some significant extent by a given private-equity firm (or other acquiring person or entity), the stronger that firm's bargaining position becomes. That is, if (in bankruptcy proceedings) an acquiring private-equity firm would stand first in line to be repaid, and if it is further the case that, should the company default on its repayment obligations with respect to the debt, the private-equity firm would have foreclosure rights with respect to collateral that is ostensibly essential to the operation of the company, then the target company would typically be wise to negotiate with the private-equity firm.

It is for at least this reason that firms operating in the distressed-debt-to-equity sector of private-equity investing very often pursue the senior, secured bank debt of target companies. Such firms are often able to purchase this senior, secured bank debt—once it becomes distressed—of these target companies for at least the reason that lenders very often prefer to confine the scope of their activities to lending; that is to say, they want to simply be lenders, and they would prefer to unload non-performing debt rather than to parlay such debt into equity stakes in the borrowing (and now struggling) companies.

As mentioned, debt can end up on the balance sheet of a company as a result of the then-current management of the company making a business decision to take on that debt for one or more of what could fairly be called "positive" purposes, such as trying to grow the company, trying to sustain it, trying to save it, trying to adapt it to a changing world, etc. It is also fairly common, however, for debt to end up on the balance sheet of a company—and later become distressed—as a result of the company being the object of what is known as a leveraged buyout (LBO), where an outside entity (e.g., an investment fund) had acquired a controlling interest in, and thereby effectively took over, the company using funds that the acquiring entity itself had borrowed, putting the "leveraged" in "leveraged buyout."

In a typical LBO, there is a core of senior, secured bank debt at the heart of the financing obtained by the acquiring entity. This core of senior, secured bank debt is typically secured by collateral that includes the assets of the very company that is being acquired, essentially using the positive aspects of that company's balance sheet against it. In some cases, the collateral that secures this core of senior, secured bank debt may also include one or more, and perhaps all, of the assets of the acquiring entity.

And even if an LBO is initially successful, this manner of acquiring a company is often fraught with continued instability, in that the balance sheet of the company after it has been acquired is then quite burdened with the debt that (i) was used to acquire the company in the first place and (ii) is secured at least in part by all or nearly all of the company's assets. If it turns out that the company cannot thereafter generate cash flows sufficient to keep up with the required payments on that debt, it can soon occur that that debt will become distressed. Thus, especially in times of economic downturn, and even more especially in times of economic downturn that occur after a period during which acquiring companies by way of LBOs was "all the rage," a good number of "vulnerable" post-LBO companies may have indeed become attractive targets for a private-equity-investing firm that engages in the control-investing side of the investment of private equity in distressed-debt assets.

And if this core of senior, secured bank debt should become distressed (as a result of whatever reason or reasons may prevail in a given situation), it would very likely be this debt in particular in which a private-equity firm that engages in control investing of private equity in distressed debt would seek to obtain a sufficient (e.g., majority) interest. Indeed, and as described above, obtaining such an interest is typically an important and very often a requisite goal for such a private-equity firm to achieve when attempting to successfully execute its control-investing strategy with respect to a given target company, to facilitate the private-equity firm being able to ultimately succeed in gaining control of the target company, guiding that company into and through restructuring and reorganization, and then selling it.

Easier said than done, of course. In between the time that (1) a given private-equity firm decides that a given company might be an attractive target to evaluate for potential acquisition, restructuring, and selling in substantially the manner described above (perhaps by identifying that, in the not-too-distant past, that company was itself the object of a successful takeover by way of an LBO (and perhaps by also identifying one or more additional conditions, e.g., that there has been a recent economic downturn, such as a decrease in consumer spending, in at least the sector of the economy in which the company operates)) and (2) the given private-equity firm has successfully acquired a sufficient degree of the senior, secured bank debt of that target company such that the private-equity firm can then begin moving forward with the ensuing processes and steps described above (e.g., triggering a restructuring, negotiating to have the private-equity firm's interests in the company's distressed debt converted into a controlling equity ownership stake in the company, hopefully selling the company at a profit, etc.), the private-equity firm must first identify, locate, and individually negotiate to acquire a sufficient aggregate amount of the many pieces of the company's senior, secured bank debt.

Among the reasons that private-equity firms must expend time, manpower, and other resources in an effort to identify and locate pieces of a given target company's debt (e.g., senior, secured bank debt) is that this sector of the financial world operates almost entirely on private information and private contractual matters—that is to say, as compared with other sectors of the financial world such as the public trading of securities on an exchange such as the New York Stock Exchange®, NASDAQ®, and the like, the debt sector of the financial world is not obligated to make a great deal of the relevant information public; in short, there is not an analog to the Securities and Exchange Commission (SEC) in the private debt market.

Also among the reasons that private-equity firms must (in the sense that they typically find it in their advantage to) undertake this "detective"-type work is that it is a very common practice for a given large commercial bank—that is ostensibly the entity from which, for example, an acquiring entity in a leveraged-buyout context takes on (i.e., borrows) all of the senior, secured bank debt that the entity will then use to carry out the LBO—to do what is known as "syndicating" the loan, or to be part of what is known as a "syndicate" with respect to the transaction by which the acquiring entity is taking on this senior, secured bank debt.

What this means is that, often soon after the closing of the transaction between the original lender (a bank, in this example) and the borrower (an acquiring entity in an LBO, in this example), or perhaps at a later time, the original lender often "syndicates" (now used as a verb) (a.k.a. "farms out") that debt in some number of smaller pieces to some number of other lending institutions, referred to herein at times as "downstream" lending institutions. And each of these, while they are labeled "lending institutions" in this written description, could include or consist of one or more individuals, one or more groups of people, one or more institutions in what may be considered the more conventional sense of the term (banks, hedge funds, etc.), and/or one or more other possibilities. That is, the term "lending institutions" (and variants such as "lenders" and others) is used for clarity of presentation and not by way of limitation.

Further to that point, and in particular with respect to the downstream variety, lending institutions are referred to as such in this description for the essentially tautological reason that, by virtue of being a buyer of one or more pieces of a larger debt, they become (if they were not already) an entity to which money is owed according to the terms of one or more loans for at least the time during which they own those one or more pieces of debt. That is, these institutions need not be—but certainly can be and often are—in the business of directly contracting with borrowers to lend them money (i.e., be an original lender with respect to one or more loans), but are just the same referred to in this description as "lending institutions."

Thus, and just as an example, after closing a deal to lend 200 million dollars to a putative acquiring entity, a commercial bank may then sell twenty different ten-million-dollar loans to twenty different, perhaps smaller, downstream lending institutions. And typically, the commercial bank that "sat at the table" during the transaction with the acquiring entity (borrower) would remain involved as what is known as the "servicer" or "servicing agent" of the debt. That is, the acquiring entity would still make payments to the commercial bank, which would then funnel those payments in a pro-rata fashion to the other lending institutions, typically collecting fees along the way for doing so, and perhaps more importantly avoiding what could be devastating to many such banks: keeping the entire debt on their books, and then watching as that debt is defaulted on. And in many cases the commercial bank may not sell of the entirety of debt, as this is offered for illustration and not by way of limitation.

If that debt (on the macro scale) at some later time becomes distressed, it is those downstream lending institutions (or perhaps other further-downstream institutions, if multiple conveyances of one or more of the pieces of the larger debt have occurred) that would potentially lose a revenue stream of payments. And therefore it would be those lending institutions (i.e., the one or more people and/or one or more business entities that are the respective current owners of the respective various smaller debts that collectively make up the senior, secured debt of the company that either borrowed the money or that was taken over with that borrowed money) that might be open to the idea of selling their partial interest in that debt that is distressed on a macro level. If only a buyer can find them.

Recalling the earlier discussion of the generally non-public nature of (what is largely private-contractual) information in the debt sector of our market economy, a private-equity firm that is interested in successfully engaging in the control investing of private equity in distressed debt finds it to be an integral part of their success that they be able to identify enough of the downstream lending institutions that actually currently own pieces of a given company's distressed, senior, secured bank debt that the private-equity firm has a realistic chance of succeeding in taking over ownership of the company, restructuring it, selling it to the highest bidder, and so on, as described herein.

But again, there is no public repository of this information that such a private-equity firm can simply access and subsequently use in attempting to acquire the pieces of the distressed debt of a company. And it is noted with respect to language that the instant company in this example is, at this stage in its life cycle, now fairly characterized as a "target company" of the private-equity firm, not to be confused with the fact that the same company might also once have been fairly characterized as a "target company" of an acquiring entity in an LBO.

And private-equity firms that engage in the model of investing that is described herein—and/or one or more that are substantially similar—have the added complexity of even trying to figure out in the first place what debts (that might be distressed) are out there, leaving aside for the moment the problems and complexities associated with trying to identify, locate, and acquire a critical mass of the disparate pieces of those possibly-distressed debts after such debts have been successfully identified, and perhaps investigated and/or evaluated somewhat.

A private-equity firm, once having identified the company as one of the firm's targets, could try simply reaching out to the commercial bank that is acting as the servicing agent for the target company's distressed senior, secured bank debt. In particular, the private-equity firm might try contacting the bank at what is typically known as the bank's "syndication desk," and simply asking for an identification of the downstream lending institutions for which the bank is acting as the servicing agent in connection with the various pieces of the target company's distressed senior, secured bank debt. If this ever works, it typically does not work often enough to be relied upon by the private-equity firm as a lynchpin of their approach to doing business.

As another option, a private-equity firm could attempt to build such rich and mutually beneficial relationships with such a large number of potential downstream lending institutions that the private-equity firm would have little trouble amassing an impressive database that identified most if not every piece of distressed debt of every target company in which the private-equity firm was even at least somewhat interested. In other words, the private-equity firm would be attempting a "bottom-up" approach of just amassing a massive collection consisting of all of the puzzle pieces that all of the puzzle-piece holders (i.e., all or nearly all of the potential downstream lending institutions participating in at least the relevant sector of the economy). This is at worst impossible, almost certainly not feasible, and at best impractical. Indeed, the sheer number of potential downstream lending institutions is far too great to make this approach attractive (i.e., likely profitable), and might even be too great to make it possible.

And still another option would be to do as the "casual" investor in distressed-debt assets does, which is to review and pay attention to mass-media sources such as The Wall Street Journal®, the Bloomberg® television station, and the like, and thus receive the information—on which the private-equity firm would then decide whether and how to act—at the same time as do millions of other readers, viewers, etc. This has numerous disadvantages, not the least of which is that a given potential target being the subject of coverage at that level of exposure would likely have the effect of substantially immediately creating a demand (i.e., sellers') market in which the instant private-equity firm would be but another competitor, eviscerating any advantages (such as being able to buy lower, being able to buy at all, etc.) that inure from having such information before others (and especially before millions of others) have it as well. Indeed, when it comes to profitably conducting a control-investing strategy with respect to the investment of private equity in distressed debt, timing is everything: the early bird truly does get the worm.

It is therefore not a stretch to say—when considering all of the inherent complexity, the timing issues, the importance of being able to build and genuinely nurture seemingly countless interpersonal and inter-institutional relationships, and so on (and indeed a list of the challenges, advantageous attributes, and best practices could go on and on)—that thriving in the context of control investing private equity in distressed-debt assets is not easy. And as the inventor of the presently disclosed systems and methods understood in designing and realizing them, it helps immeasurably to have the information you need when you need it.

Accordingly, disclosed herein are processor-based systems and computer-implemented methods for identification, sourcing, and acquisition of distressed debt. The present methods and systems are aptly arranged, designed, and programmed to facilitate private-equity professionals being able to more efficiently, more expeditiously, and in a more-organized manner conduct and carry out the tasks, communications, assessments, analyses, transactions, and the like that are part and parcel with the profession of conducting, inter alia, control investing of private equity in distressed-debt assets, and of course to facilitate the ongoing effort of professionals operating in this market sector to optimize the results realized therefrom.

Indeed, the present systems and methods were born at least in part from the inventor having developed—by way of having amassed vast experience, and further by way of having developed significant expertise, in the relevant art—a nuanced understanding and appreciation of how the likelihood of thriving in the context of the investment of private equity in distressed-debt assets is greatly enhanced by having the right information at the fingertips of the right people at the right time. As such, the present systems and methods provide an innovative processor-based computing and communication platform that facilitates efficient and timely identification of target companies (i.e., those likely to have both distressed debt and attractive intrinsic and/or inherent qualities and value, making them potentially appealing candidates for being "flipped," to borrow a term from the real-estate world).

And it is noted that, throughout this written description, various embodiments are described as being in a category such as systems, platforms, and the like. This, however, is done for reasons such as readability and clarity of presentation, and not to imply in any way that one or more descriptions of one or more features, one or more capabilities, etc. in connection with a given embodiment that is characterized as a system, platform, or the like does not apply with equal force to embodiments that take the form of computer-implemented methods—i.e., methods that are carried out by the described systems, platforms, and the like.

In general, then, unless context dictates an incompatibility or other reason that this could not be the case, any one or more features, functions, bells, whistles, etc. that are described in connection with any given embodiment are not in any way meant to be limited in applicability to that embodiment, but instead are applicable to any and all embodiments for which neither compatibility nor interoperability would appear to reasonably be in question. And further to that point, any phrasings in this description such as "the present system" or "the present methods" should each be read as "the present systems and methods," and again such phrasing is used for reasons such as readability and clarity of presentation, not by way of limitation.

One advantageous aspect of the present system is that it facilitates identification of debt transactions that have occurred in the past, and that therefore might become distressed and lead to an opportunity for a private-equity firm. Again, a challenge that must be overcome if control investing of private equity in distressed debt is to be done profitably is that the given private-equity firm must identify—from what, again, is (generally) non-public information—as much as they can of what may be called the "debt universe," i.e. the set of all outstanding bank debt (or at least the set of all outstanding bank debt that matches certain criteria).

With a comprehensive debt-universe-identification system in place, a given private-equity firm can be relatively confident that it will be able to identify all (or perhaps nearly all) of the attractive (or at least potentially attractive) distressed-debt situations that arise, because the firm has tools to efficiently and expeditiously identify much if not all of the debt that is currently owed by debtors to creditors in the market at large, or at least in the one or more segments of the market on which a particular private-equity firm may focus. In short, such a private-equity firm should, for the most part, be uniquely positioned to take advantage of all of what the firm would consider to be the good options that come up if the firm has systems and tools that facilitate first identifying all of the options, from which the best can then be selected.

To facilitate early and comprehensive identification of target companies and their debts, the present system—in at least one embodiment—includes a set of functionality collectively referred to at times herein as a "target tracker," which includes a target data store and a target user interface. In at least one embodiment, the target data store contains data profiles of various private companies, where such data profiles may include data fields such as name, location, website address, telephone number, contact information for one or more people at the company, free-text fields for keeping notes about the company, and so on. Thus, the present system includes a target data store that includes target-company profile records in which the personnel that work at the private-equity firm that is utilizing the present system can keep detailed and current records to aid in their collective evaluation of various target companies.

In at least one embodiment, the target tracker maintains in the target data store a comprehensive, well-organized, and easily accessible collection of loan profiles, which, as is known in the industry, are static records (e.g., tear sheets) that are created substantially at the time a deal (i.e., a transaction), such as an acquiring entity taking on debt to attempt an LBO, takes place. These loan profiles are created at that time, and they memorialize certain parameters of the deal, such as the deal size (i.e., dollar value), type of transaction, date of transaction, and other basic debt-transaction parameters, as is known to those in the art. These loan profiles are not updated after their original creation, and are fairly analogous to static records that are created when real-estate transactions are closed.

And in fact, to some extent, the primary use of these loan profiles in the debt sector of the financial industry—and what one might call their "raison d'être" (reason for being) is similar to the primary use in the real-estate sector of real-estate transaction records: they provide "comps" (i.e., "comparables" or "comparable transactions") as guides to setting parameters of future somewhat-analogous transactions. And there are data sources (e.g., paid-for subscription services) from which loan profiles from bank-loan transactions can be obtained.

The typical customer of such a service would be a commercial bank that wants to have more-comprehensive market information when deciding how to structure various upcoming transactions. One example of such a service is DealScan®, which is currently offered by Thomson Reuters LPC (currently having an office in New York, N.Y.). Another data source for loan-profile data is DebtX®, offered by The Debt Exchange, Inc.® (currently headquartered in Boston, Mass.). Another data source for loan-profile data is provided by IntraLinks® (currently headquartered in New York, N.Y.). Another is Syndtrak®, provided by FIS® (currently headquartered in Jacksonville, Fla.). And yet another is Trepp® (currently having an office in New York, N.Y.). Another is Capital IQ® (currently headquartered in New York, N.Y.). Yet another is Pitchbook® (currently headquartered in Seattle, Wash.). Another example is CDO Suite™ from Deloitte® (e.g., Deloitte & Touche®) (currently headquartered in New York, N.Y.). Another is Wall Street Analytics, which has moved to Moody's Analytics® (currently headquartered in New York, N.Y.). Another is the Wall Street Office® suite of products from Markit® (currently headquartered in London, England). Another is CLO Master® from Creditflux® (currently headquartered in London, England). And certainly there are others that could be used instead or in addition to one or more of those listed here, as is known to those in the art. And one or more of these data sources may provide one or more other types of data, such as the SPV-modeling data described below and/or one or more other examples, as is known to those in the art.

Thus, the private-equity firm may establish and maintain a subscription to a service from which the firm can (and does) acquire loan-profile records for later assessment and evaluation. In accordance with at least one embodiment, loan-profile records are downloaded and saved to the target data store by one or more people. In at least one embodiment, each loan-profile record is saved as a PDF® (Portable Document Format®) file using a naming convention that reflects one or more data values contained in the loan-profile record, such as transaction date, identification of the agent bank, deal size, type of transaction (e.g., LBO), and/or one or more other properties of the deal with which that particular loan-profile record is associated.

In at least one embodiment, the loan-profile records are manually saved to a particular folder in an organized folder structure maintained by the present system, where the location in the folder structure in which a particular loan-profile record is stored indicates, much like the use of a file-naming convention, at least one property about the deal from which the particular loan-profile record was created. As examples, a folder structure could group loan-profile records by deal type, or perhaps by ranges of deal size (e.g., $200-$250 million).

In some embodiments, different levels of a folder (i.e., file-storage) structure could be associated with different parameters; as an example, a folder structure could be used where a top level of the folder structure is organized by deal type (e.g., LBO, Recap, Acquisition, etc.) while the sub-folder structure within each particular deal type could be organized by ranges of deal size. In at least one embodiment, loan-profile records are categorized at the "top level" by "arranger" (i.e., the commercial bank that served as the go-between with respect to the borrower and the downstream lending institutions), and then within each arranger by deal size, and then within each deal size by deal type, though this is just one example. Certainly many other possible arrangements could be used in various contexts.

In at least one embodiment, loan-profile records are downloaded from a subscription service or other loan-profile-record data source in an automated manner, perhaps using what are known as macros that capture repetitive user-interface actions (such as clicking on a given category of loan-profile record and then downloading any new loan-profile records that have shown up since the previous time such a downloading action was taken). In other embodiments, scripting languages (e.g., PERL®) could be used to execute a large number of consecutive command-line instructions in an automated and serial manner, as is known in the programming arts. And other options include batch downloads (e.g., overnight) of loan-profile records, as well as other options known in the programming and electronic-communication arts for accomplishing an automated download of a number of files across one or more data networks to a computer system such as the presently disclosed system.

In at least one embodiment, downloaded loan-profile records are processed in at least one automated manner. As one example, loan-profile records could be downloaded in a file format such as Microsoft Word® and then converted by a batch process to a more static file type such as PDF or TIFF® (Tagged Image File Format). In at least one embodiment, whether converted to a file type such as PDF by a manual process or by an automated process, the loan-profile records in PDF form may then be processed by one or more optical-character-recognition (OCR) algorithms to extract one or more data fields therefrom, perhaps lessening a burden on firm personnel of opening each downloaded loan-profile record and manually keying various deal properties into a file name and/or manually selecting an appropriate location in a folder structure, as described above.

In at least one embodiment, downloaded loan-profile records are parsed using one or more text-parsing algorithms and/or products, such that file names and/or folder-structure (i.e., file-storage) locations are generated in a substantially automated manner rather than according to a substantially manual process. And certainly other automated-processing options exist within the abilities of one of ordinary skill in the relevant arts for extracting data fields from loan-profile records and using the extracted value(s) to organize the loan-profile records for ready access by one or more people using the present system at a given private-equity firm.

Whether the downloading of the loan-profile records was manual or automated or a combination thereof, and whether the organizing of the loan-profile records by one or more of the deal properties listed in the respective loan-profile records is done using file names, a folder structure, one or more other file-organization-and-storage approaches within the ability of those in the art, or some combination thereof, and whether whatever one or more file-organization-and-storage options are employed involve manual or automated (or some combination of manual and automated) organization and storage of the loan-profile-record files, the result of the downloading and organized storage of a collection of loan-profile records puts at the fingertips of the private-equity firm personnel what is at least a "jumping-off" point for their efforts to "source"— i.e., to identify the downstream lending institutions that currently own the pieces of—whichever debts the firm decides they are interested in investigating at a particular time.

Note that, in some instances, loan-profile records are more helpful than they are in other instances, such as if a good number of lenders in a given syndicate are listed in a signature block of a credit agreement, just as an example. But often the loan-profile records simply inform the private-equity firm doing the assessment of some high-level details of a given syndicated, senior, secured bank-debt transaction, such as the identity of the arranging (servicing) bank, the identity of the acquiring entity if the deal was an LBO, the identity of the target of the LBO, and the deal size and date, among other high-level facts about the original loan transaction.

And when deciding which loan-profile records to download, and/or when deciding on which downloaded-and-stored loan-profile records to direct further focus, certain private-equity firms may look for certain combinations of characteristics of these original deals. That is, some private-equity firms may act according to a strategy that deems a certain set of debt transactions, such as those having, say, all three of a certain type (e.g., LBO), date (e.g., during or after 2004), and size (e.g., less than or equal to $200 million) as tending to bear more fruit than other subsets of the debt universe when it comes to this type of investing of private equity.

In addition to the target tracker, the present system also has a number of other functional capabilities, including but not limited to a set of functionality collectively referred to at times herein as a "sourcing tracker," which includes a sourcing data store and a sourcing user interface. As explained, sourcing is a term that refers to the process of investigation into which downstream lending institutions currently own the pieces of the larger distressed debt in which the private-equity firm is potentially interested in acquiring a controlling stake. In support of this detective-type work, the present methods and systems carry out, among other functions, one or more data-mining functions with respect to one or more data streams, one or more data sources, one or more sets of received (stored) data, and/or one or more other arrangements, collections, etc. of data. Data mining is described below in a general sense, applicable to the examples and instances described herein, in connection with FIG. 10.

In at least one embodiment, the sourcing tracker includes certain tools to assist those working at a private-equity firm with the establishment and maintenance of good working relationships with a large number of lending institutions. Thus, the sourcing tracker includes known tools used in professional social-networking and business-development contexts; i.e., the present system provides for storage of contact information for one's contacts at various lending institutions, as well as storage of data regarding the status of the relationship, records regarding one or more recent contacts, plans for the "next step" with a given contact, and so on.

In at least one embodiment, the sourcing tracker further provides user-interface-level interaction with—and viewing of—valuable, downstream-lender-identifying data that is extracted (i.e., mined) from at least one private, subscription-based data feed that is meant for an entirely different purpose, but that the inventor of the present systems and methods shrewdly realized contains data that the private-equity firm can use in order to source various debts. In an embodiment, this data includes identifiers of pieces of larger debts associated with identifiers of the larger debts of which they are pieces and further associated with an identification of the downstream lending institution currently holding that respective piece.

It often happens that the downstream pieces—of the larger debt transaction—that get farmed out to various respective downstream lending institutions then also get packaged (i.e., bundled) together into a certain type of investment product often referred to as a "CLO" (collateralized loan obligation), which itself is an instance of a broader category of investment product known as "SPVs" (special purpose vehicles). In other instances, the pieces of the debt (in which the private-equity firm is interested) get bundled into an investment product known as a "CDO" (collateralized debt obligation), which is another type of SPV. And certainly there are other types of investment products into which a given piece of bank debt may get bundled, as is known to those of skill in the art.

These investment vehicles (also known as securitizations) typically include bundled loans, debts, mortgages (in the case of a CMO (collateralized mortgage obligation)), etc. that, taken as a collective, can be characterized as having respective risk/reward profiles. And at least some aspects of the presently disclosed system, and in particular some aspects of the system's sourcing capabilities, arose at least in part from a realization on the part of the inventor that the SPV market (which includes people, institutions, and entities investing in CLOs, CDOs, and the like) operates in a manner that provides private-equity firms that invest in distressed debt with an avenue for addressing a key question, the answers to which helps the private-equity firm carry out their strategy: what lenders are holding all those little loans?

In the SPV market, oftentimes at least one investor in a given, e.g., CLO is an entity such as a pension plan, which (like many investors) typically wants more information rather than less about the risk/reward profile of a given current or potential investment. As such, a cottage business has developed, whereby people and/or companies known as "modelers" produce detailed risk/reward profiles regarding various SPVs, and in particular providing certain details about the bundled obligations that form the, e.g., CLO. Among the details that are provided about these obligations that are downstream from the larger original debt transaction: the identity of the downstream lending institution that is currently the owner of whatever piece of that original debt transaction has now been bundled into the CLO.

And these SPV modelers are not obligated by law to give detailed reports on the composition of the CLOs; rather, it has become a sort of de facto requirement in the competitive marketplace; i.e., trustees associated with SPVs such as CLOs make disclosures of detailed information to modelers in order to keep their SPVs as attractive to investors as other SPVs are.

In at least one embodiment, an aspect of the present system is that it receives and presents data provided by a modeler of SPV-type investments, and in particular that it extracts (i.e., mines) from a data feed (or data file, or set of data records, etc.) received from such a modeler the information in which the private-equity firm is keenly interested: an identification of which downstream lending institutions currently own various pieces of various debts that, at a macro level, are already distressed or may soon become so.

Thus, the private-equity firm may subscribe to a market-data service that provides such SPV-modeling data; upon receipt of that data, the present system may then extract (i.e., data mine) therefrom at least the identity of the downstream lending institutions holding various pieces of various debts (i.e., data identifying the pieces of debt, the larger debt of which they are pieces, and the identity of the downstream lending institution that currently holds the rights to the respective pieces), and organize that data for presentation to and use by users of the system. In at least one embodiment, the data source (i.e., the market-data service or market-data provider, etc.) is Intex® (i.e., Intex Solutions, Inc., currently headquartered in Boston, Mass.), though certainly others could be utilized without departing from the scope and spirit of this disclosure.

So, like the loan-profile records (e.g., tear sheets) described above as being used in embodiments of the present systems and methods, the SPV-modeling data that is used in various embodiments is really not intended for use in aiding the control investing of private equity in distressed debt. The inventor of the present system, however, has (therefore at least twice) reached across financial-industry disciplines—once to the loan-profile records (which are really meant just to serve as static records of deals and as comps for future deals) to organize and identify at a macro level instances of debt that may be likely to become distressed, and the second time to SPV-modeling data (which is meant really just to provide full risk/reward type information to investors and potential investors in SPVs) to mine that data for the nuggets about which the private-equity firm is very interested; i.e., who owns what.

Thus, among other useful capabilities, the system can generate what may be referred to as a sourcing report, which amalgamates the macro-level data learned from a loan-origination-documents source (such as DealScan®) and the micro-level data mined from an SPV-modeling-data source (such as Intex®), to present to those at the private-equity firm a comprehensive snapshot of a current status of a given effort to source and acquire a given amount of a given target company's senior, secured bank debt.

And the real-time usefulness of this modeling data to the presently disclosed system is enhanced by the fact that, in at least one embodiment, the system receives frequent updated data feeds from at least one SPV-modeler subscription data service, and accordingly updates and populates the sourcing tracker data store with any new and/or updated information as to which downstream lending institutions own which pieces of which larger debt transactions.

It should be affirmatively and clearly understood that the above-provided overview is intended to be by way of illustration and not by way of limitation.

BRIEF DESCRIPTION OF THE DRAWINGS

Various exemplary embodiments are described herein with reference to the following drawings, wherein like numerals denote like entities.

DETAILED DESCRIPTION OF THE DRAWINGS

Figure 1:
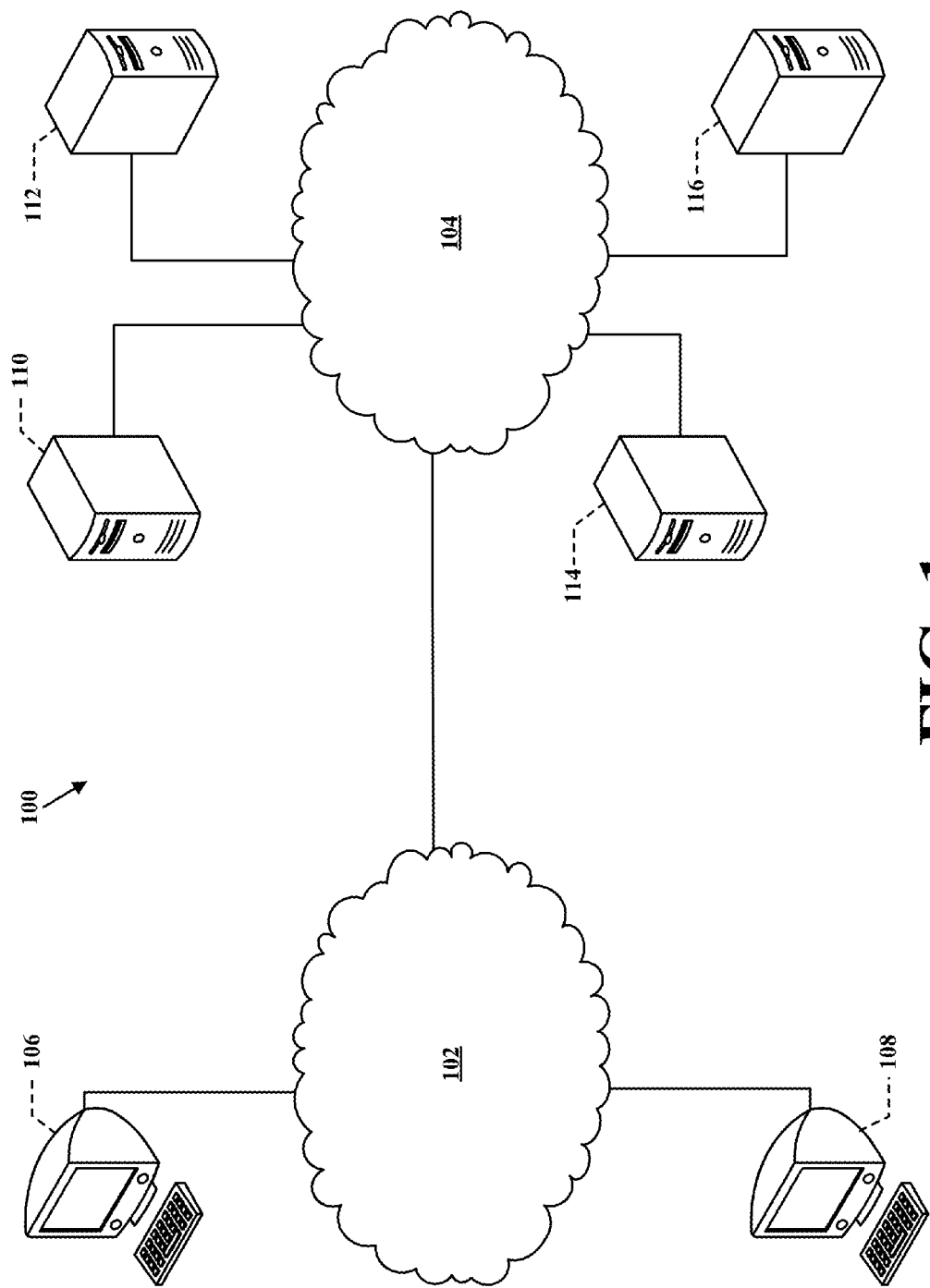
FIG. 1 is a simplified diagram of a communications system in which at least one embodiment can be carried out.

FIG. 1 is a simplified diagram of a communications system in which at least one embodiment can be carried out. As can be seen in FIG. 1, the communication system (indicated generally at 100) includes a packet-data network 102 communicatively coupled with a packet-data network 104. In at least one embodiment, network 102 is a private (e.g., corporate) packet-data network, and network 104 is a public, perhaps global, packet-data network (e.g., the Internet). In at least one embodiment, networks 102 and 104 support the well-known TCP/IP (Transport Control Protocol/Internet Protocol) protocol suite, and entities residing on those networks are addressable using IP addresses. In at least one embodiment, entities residing on network 102 and not (directly) on network 104 may each be assigned a private IP address (e.g., 192.168.1.101), while entities addressable over network 104 may each be assigned at least one publicly routable (i.e., global) IP address. It is noted that IPv4, IPv6, and/or any other suitable protocol may be utilized in a given implementation.

As can also be seen in FIG. 1, the communication system 100 includes computing devices 106 and 108 communicatively coupled to network 102. This depiction and description of two computing devices being communicatively coupled to network 102 is by way of example only, as any suitable number of such computing devices may be present in a given implementation. As a general matter, the depiction and description of the particular types and quantities of entities, devices, systems, networks, etc. in connection with the presently disclosed systems and methods are meant by way of illustration and not limitation. Any suitable number of computing devices, networks, and so on may be used in a given implementation, and the functions described herein as being carried out by one or more computing devices, entities, etc. may be carried out by way of one or more processors executing instructions stored as software, firmware, and/or hardware, as seen fit by the designer(s) of a given implementation.

And it should be further noted that the term "system" as used to describe communication system 100 is not meant to be interchangeable with the term "system" as used in the claims, in phrasing such as "the present systems and methods," and the like, where a system could take the form of a single computing device, a part of a single computing device, a combination of cooperating computing devices, and/or any other permutation or combination deemed suitable for a given implementation.

Returning attention to FIG. 1, one or both of the computing devices 106 and 108 may include a user interface, a communication interface, at least one processor, and some form of data storage having stored thereon instructions executable by their respective at least one processor for carrying out the computing-device functions described herein. Note that computing devices 106 and 108 could be instances of the exact same type of computing device, but could just as well be instances of two different types of computing devices. Computing device 106 and/or computing device 108 could fit the description given with respect to computing device 800 of FIG. 8. As examples, one or both of computing devices 106 and 108 could be or include a laptop computer, a desktop computer, a tablet device, a cell phone, a personal digital assistant (PDA), and/or any other suitable device or devices.

In FIG. 1, communication system 100 is depicted as also including four data sources 110, 112, 114, and 116 that are each communicatively connected to network 104, and that each may comprise one or more servers having network interfaces, processors, data storage, etc. as is known in the art. Of course, as stated above more generally, and as applied specifically here, there could be fewer or a greater number of data sources present in a given implementation, and one or more data sources could be communicatively connected to a different network, as the depiction in FIG. 1 of four data sources that are each separately communicatively connected to network 104 is by way of illustration and not limitation. The nature, data content, functionality, etc. of these various data sources is described in the balance of this description of the presently disclosed systems and methods. As but two illustrative examples, data source 110 could be a loan-profile-record (e.g., loan-origination-document) data source such as DealScan®, while data source 112 could be an SPV-modeling data source such as Intex®.

Figure 2:
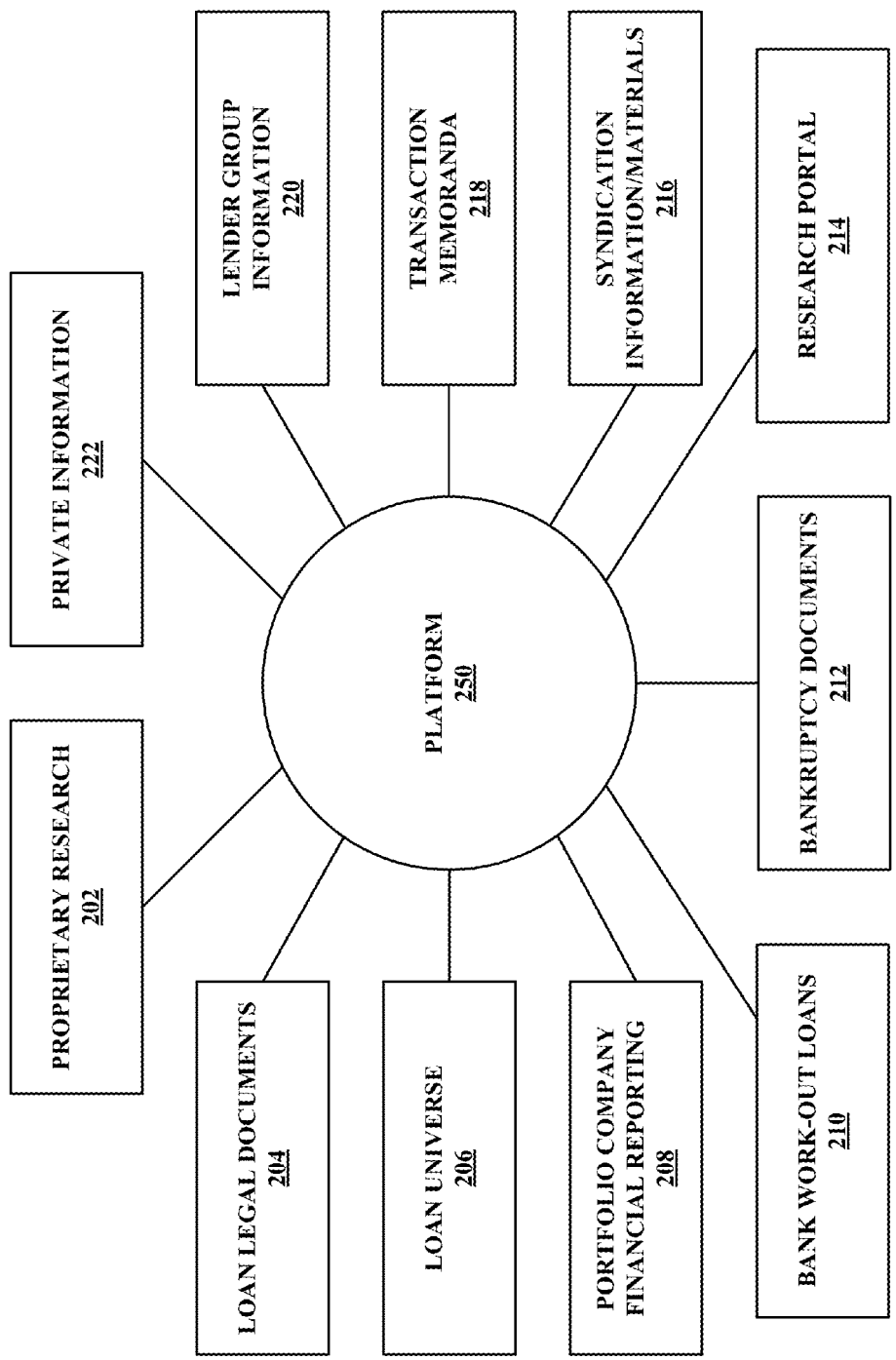
FIG. 2 is a simplified representation of a computing system in accordance with at least one embodiment.

FIG. 2 is a broad-stroke, high-level conceptual view of the present system, showing the present computing system (i.e., platform) 250 in the center of the hub-and-spokes configuration. And around the outside of FIG. 2, each connected to the platform 250 is a number of data sources and capabilities that, to some extent, provide a bird's-eye view of the system. In counterclockwise order, those data sources and capabilities of the presently disclosed systems and methods are: Proprietary Research 202, Loan Legal Documents 204, Loan Universe 206, Portfolio Company Financial Reporting 208, Bank Work-Out Loans 210, Bankruptcy Documents 212, Research Portal 214, Syndication Information/Materials 216, Transaction Memoranda 218, Lender Group Information 220, and Private Information 222. FIG. 2 is but one way to conceptualize the present systems and methods, and is presented to aid the reader's conceptual understanding, but is not presented to offer any explicit or implied limitations as to the data sources and/or capabilities that may be present in various embodiments.

Figure 3:
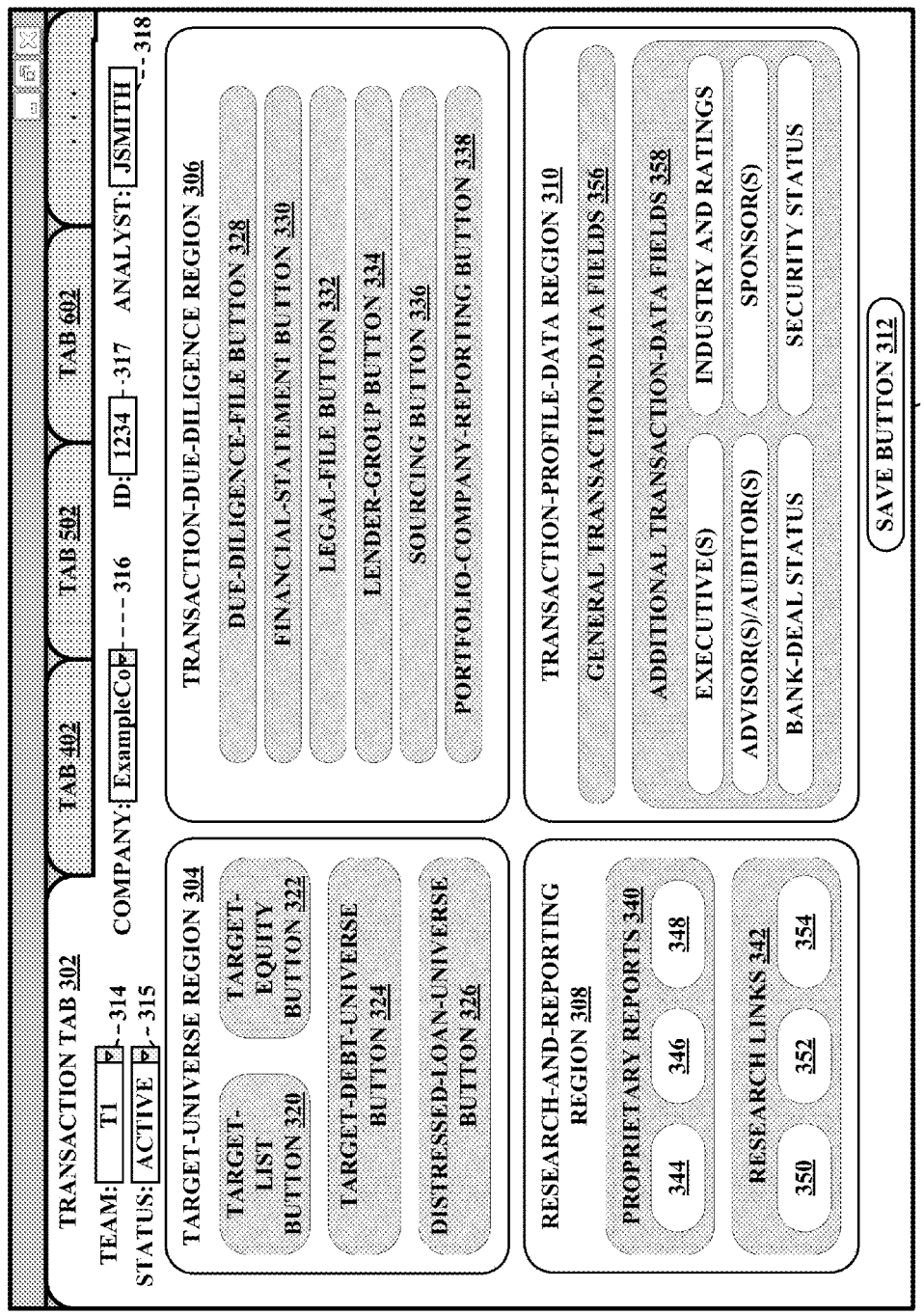
FIG. 3 is a screenshot of a user interface in accordance with at least one embodiment.

FIG. 3 is a screenshot 300 of a user interface in accordance with at least one embodiment. As shown in FIG. 3, screenshot 300 shows a series of tabs (302, 402, etc.) near the top, with a transaction tab 302 shown as currently selected, as is known in the art. Tab 302 includes a target-universe region 304, a transaction-due-diligence region 306, a research-and-reporting region 308, a transaction-profile-data region 310, a save button 312, a team dropdown 314, a status dropdown 315, a company dropdown 316, an ID field 317, and an analyst field 318.

In general, transaction tab 302 is a bit of a "home page" for the private-equity professionals using the system, and it facilitates these professionals being able to "slice and dice" the key data with which they work in different ways and with respect to different transactions (i.e., with respect to different efforts at different stages of completion (or potential completion) to obtain controlling interests in different target companies). In various embodiments, one or more of the dropdowns could be proactive (i.e., can be used to select transactions by team, status, or company, etc., potentially resulting in one or more other dropdowns and/or data fields being responsively populated, updated, etc., as is known in the art) and/or reactive (i.e., their value updates in response to manipulation of one or more other menus, etc., as is known in the art).

And it should be appreciated that FIGS. 3-6 are by way of example, and that different combinations, subsets, supersets, arrangements, etc. of the presented data could be used in various implementations without departing from the scope or spirit of the present disclosure. Additionally, while a fair amount of detail is provided in (and about) FIGS. 3-6 (among others), not every aspect of each of these figures is exhaustively described in this description; this is due to a number of considerations, one of which is the self-evident nature of certain simple user-interface elements (e.g., fields for name, address, etc.), another of which is that those of skill in the art will readily appreciate the purpose and function of various user-interface elements (e.g., many of the back-office functions depicted on FIG. 6), and another of which is simple clarity of presentation, of course not to the exclusion of any one or more other considerations.

Returning to FIG. 3, it can be seen that the target-universe region 304 includes a target-list button 320, a target-equity button 322, a target-debt-universe button 324, and a distressed-loan-universe button 326. These user-interface elements 320-326 may be operative in various embodiments to present different slices or cross-sections of different subsets of data that the present system has mined and organized from various data sources, as described herein.

Selection of the target-list button 320 may bring up a detailed list of the various target companies that the private-equity firm has decided to attempt to acquire, perhaps including some that the firm has already started to attempt to acquire. This list may be in tabular form, and may include additional data fields (address, web address, etc.) about each target, and may also be populated with data reflecting their current debt situation, perhaps as well as links to associated loan-profile records, along with data reflecting the extent to which the pieces of that company's debt have been identified, located, acquired, etc. using the present systems and methods.

That is, the present system may receive loan-profile-record data from one or more sources, and thereby associate target companies with debts that may well be distressed, and furthermore receive SPV-modeling data from one or more sources, and mine that data to identify associations between the debts at the macro level and the debt pieces at the micro level; and furthermore associate—e.g., by relational-database techniques—data regarding these debts and their respective debt pieces. Putting all of this information (including but not limited to (1) data identifying companies likely to have distressed debt and attractive assets, associated with (2) data identifying those debts themselves at the macro level, associated with (3) data identifying many if not all of the pieces of those debts (i.e., where to find them)) at the fingertips of the private-equity professionals in this organized, distilled, and interconnected manner provides numerous advantageous efficiencies and capabilities with respect to the professionals' efforts to profitably engage in the control investing of private equity in distressed-debt assets.

Selection of the target-equity button 322 may bring up a tabular readout of much of the same information, though this time focused on the assets of the target companies rather than on their debts, to assist the private-equity professionals in their evaluations and acquisitions.

Selection of the target-debt-universe button 324 may bring up a tabular readout of much of the same information described above in connection with target-list button 320, though organized not by the target company but by the pieces of debt that the private-equity firm has decided to acquire (or at least attempt to acquire, investigate whether to try to acquire, etc.). In at least one embodiment, this data is viewable (i.e., sortable) in a manner that is grouped by the larger debt (i.e., the particular original loan) from which the farmed-out pieces derive, by the downstream lending institution that currently holds the particular pieces, by the servicing agent, and/or by one or more other properties of the debt pieces.

Selection of the distressed-loan-universe button 326 may bring up a tabular readout that is organized according to loans on the "macro level" (as that term is used herein), and that includes data on all or substantially all of those loans that the private-equity firm is evaluating as potentially distressed; i.e., the scope of data presented in response to selection of this function may be investments under consideration, organized on the macro-loan level. And certainly it is contemplated that this readout, as with all others disclosed herein, is sortable, viewable, filterable, etc. by one or more properties, as is known in the programming arts.

As mentioned above, the transaction tab 302 includes a transaction-due-diligence region 306, which generally provides users with an interface to store and access data that pertains to the detailed review (i.e., the due diligence) that the private-equity firm performs in connection with companies that the firm has decided to acquire, or at least to seriously look into acquiring. As can be seen, this region of the user interface provides the user with access to the due-diligence file being kept for a particular transaction, financial statements, legal records, lender-group information, sourcing (i.e., directly pertaining to the investigation into and (typically piecewise) acquisition of the debt of the target company.

And region 306 further includes a portfolio-company-reporting function (e.g., button) 338, the activation of which presents to the user data that has been reported by the target (or perhaps, by that stage, acquired) company to the private-equity firm; in an embodiment, the system provides automatic and/or manually triggered prompts to one or more people at the target company, requesting that they provide specific information to the private-equity firm in a specific format, to standardize and normalize the firm's operations to some extent.

The research-and-reporting region 308 is depicted as including a proprietary-reports region (having selectable buttons 344, 346, and 348) and a research-links region 342 (having selectable buttons 350, 352, and 354). In various embodiments, different numbers (including zero) of proprietary reports and/or research links could be provided to sources such as Capital IQ®, IntraLinks®, Syndtrak®, LoanX®, EDGAR®, Lexis-Nexis®, DebtWire®, Bill Barrett Corporation (of Denver, Colo.) (NYSE: BBG), etc.

In at least one embodiment, the transaction tab 302 includes a transaction-profile-data region 310, which generally provides users with an interface to store and access data that pertains to the basic bibliographic and other basic details of a given target acquisition, such as name, address, names of executives, industry and ratings, identification of one or more advisors and or one or more auditors associated with the transaction, identification of one or more sponsors, bank-deal status, security status, and/or one or more other details and/or data fields.

Figure 4:
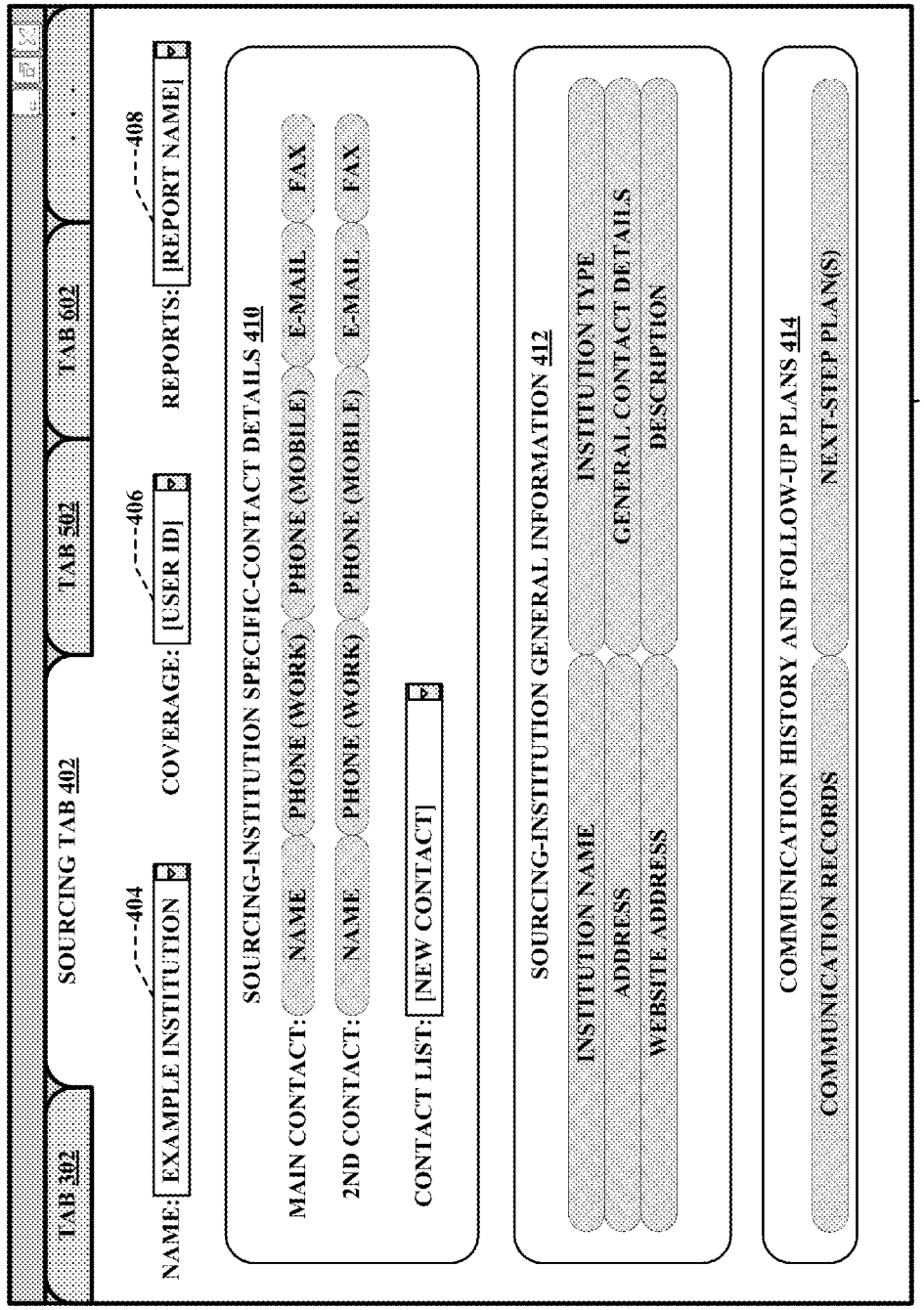
FIG. 4 is a screenshot of a user interface in accordance with at least one embodiment.

FIG. 4 depicts a screenshot with a sourcing tab 402 having been selected. As can been in FIG. 4, this tab includes an institution-name dropdown 404, a coverage dropdown 406, a reports dropdown 408, a sourcing-institution-specific-contact-details region 410, a sourcing-institution-general-information region 412, and a communication-history-and-follow-up-plans region 414. As can be appreciated from this written description in general and from a review of FIG. 4, tab 402 serves as an easily accessible interface to the sourcing-tracker functionality discussed above, and in general tab 402 facilitates the private-equity professionals being able to maintain and nurture relationships with contacts at various lending institutions.

Figure 5:
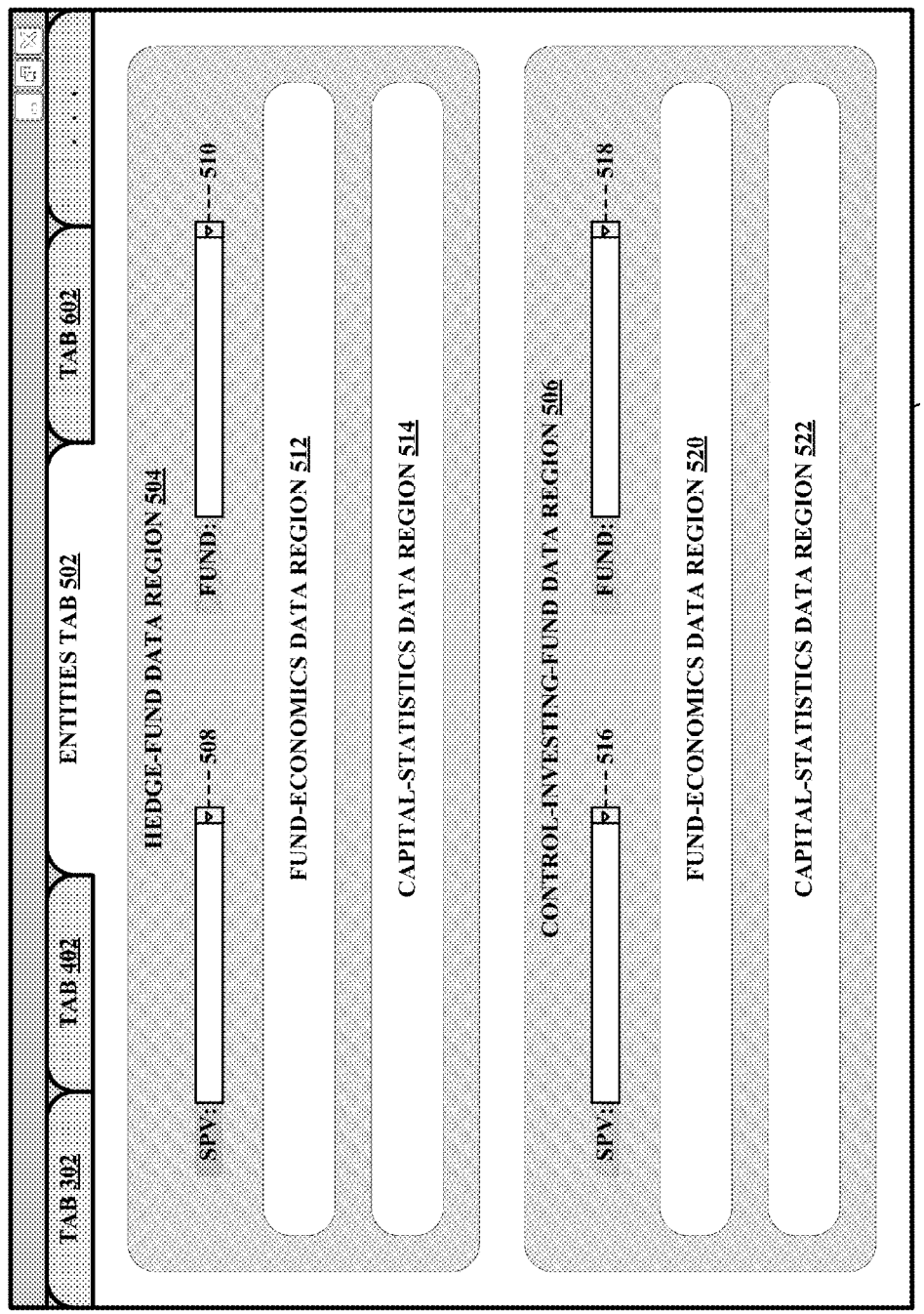
FIG. 5 is a screenshot of a user interface in accordance with at least one embodiment.

FIG. 5 shows an entities tab 502 having a hedge-fund-data region 504 and a control-investing-fund-data region 506. Both of these regions provide dropdowns (which, like the other dropdowns described herein, could be proactive and/or reactive) pertaining to looking up various SPVs and various funds that may be held by a firm's hedge fund or control-investing fund, respectively. And both of these regions further include data-readout areas 512, 514, 520, and 522 where data for selected SPVs, etc. may be viewed and/or updated. Note that the premise of tab 502 is that the associated private-equity firm maintains a hedge fund separate from a control-investing fund, where a given investor might invest in either, both, or neither. But this premise is merely illustrative and should in no way be interpreted as necessarily present in every embodiment of the presently disclosed methods and systems.

Figure 6:
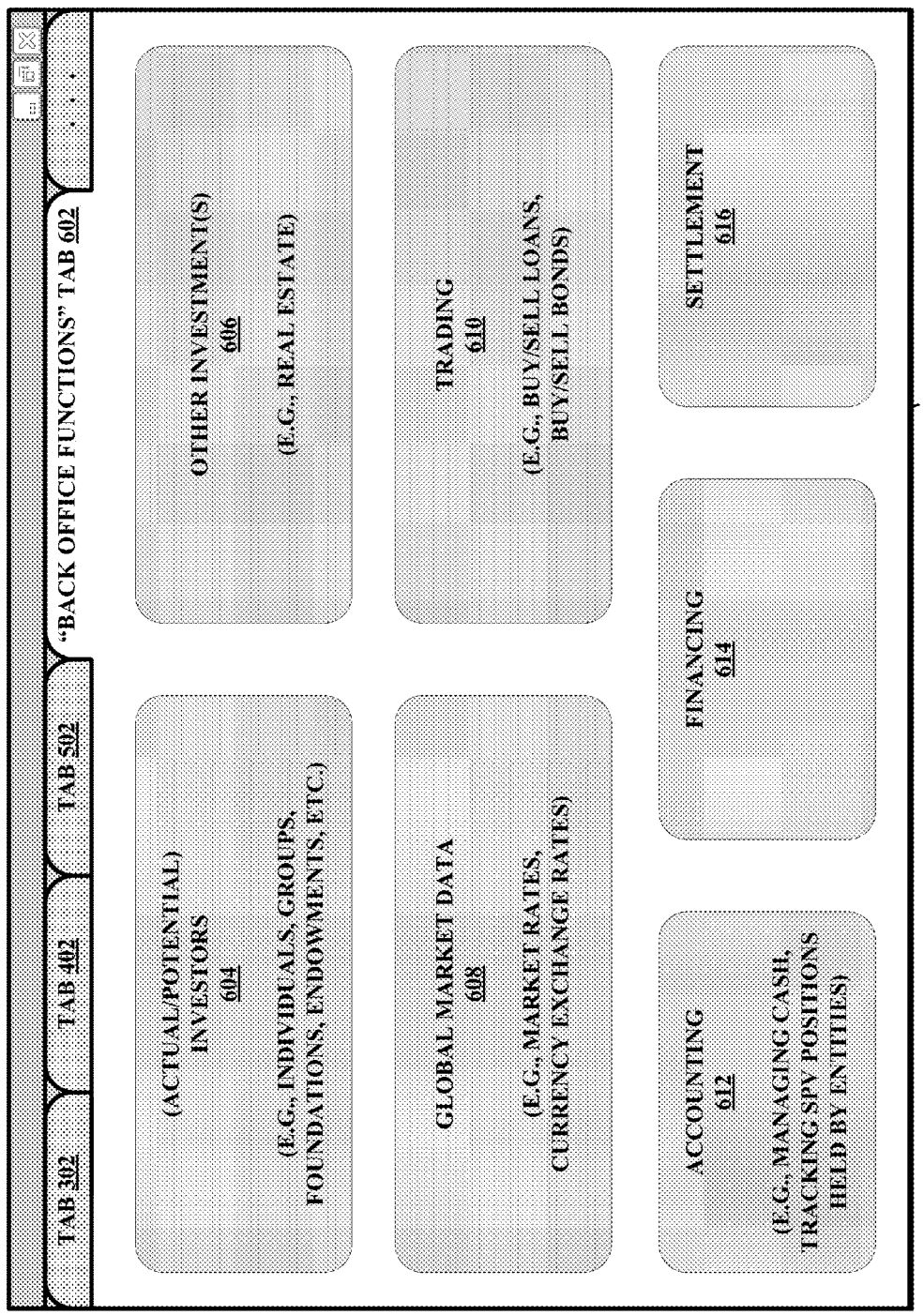
FIG. 6 is a screenshot of a user interface in accordance with at least one embodiment.

FIG. 6 depicts a back-office-functions tab 602 having a number of regions, including an actual/potential-investors region 604, an other-investment(s) region 606, a global-market-data region 608, a trading region 610, an accounting region 612, a financing region 614, and a settlement region 616. These various back-office functions are generally known to those of skill in the art, and thus are not described in great detail here. And it should be noted that one or more different and/or additional back-office functions (human resources, etc.) could be provided by the system and perhaps represented on a display such as tab 602. Region 604 may provide functionality with respect to individual investors, groups of investors, investor institutions, and the like in a manner similar to the functionality provided by tab 402 with respect to lending institutions. Region 606 may provide an interface for storing, accessing, updating, etc. information regarding other investments (such as real estate) that the given private-equity firm may hold from time to time. And the regions 608-616 provide back-office functionality with which those of skill in the art are familiar.

Figure 7:
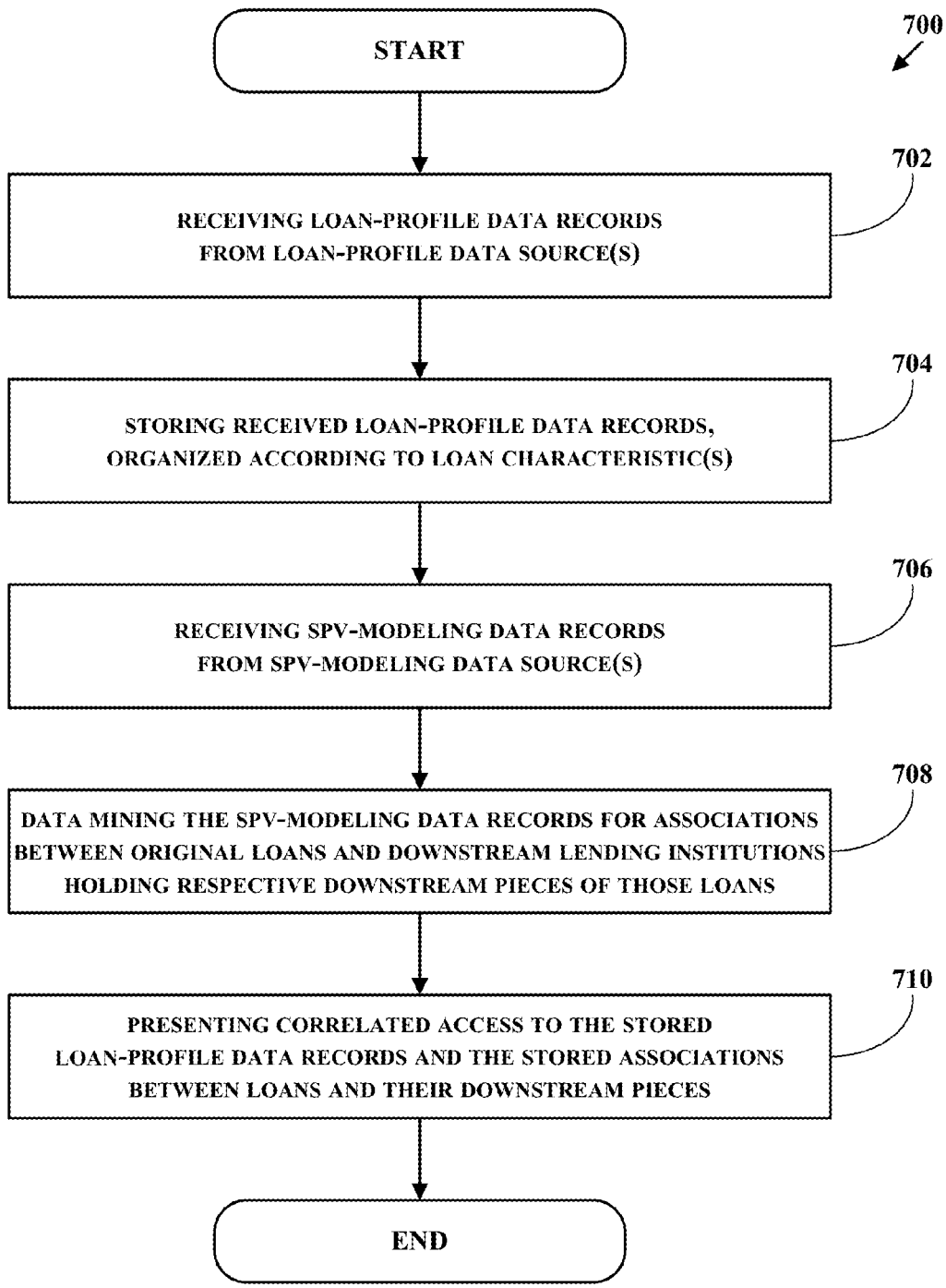
FIG. 7 is a flowchart depicting functions carried out in accordance with at least one embodiment.

FIG. 7 is a flowchart depicting functions carried out in accordance with at least one embodiment. In particular, FIG. 7 depicts a method 700 described as being carried out by a computing system that comprises at least one user interface, at least one communication interface, at least one processor, and data storage having stored thereon instructions executable by the at least one processor for carrying out the recited functions. In at least one embodiment, the at least one user interface comprises at least one visual display. In particular, method 700 may be carried out by computing device 106, though this is of course just an example. And it is noted that the steps recited as being carried out as part of method 700 need not necessarily be carried out in the order in which those steps are described.

Method 700 begins at step 702, with the computing system receiving loan-profile data records from at least one loan-profile data source. Each loan-profile data record is associated with an original loan from a respective original lender to a respective original borrower for a respective original loan amount. And each received loan-profile data record includes data that reflects one or more loan characteristics of the loan associated with that loan-profile data record. In at least one embodiment, step 702 involves at least one loan-profile data record being manually downloaded. In at least one embodiment, step 702 involves at least one loan-profile data record being downloaded in at least one automated manner, which as examples could take the form of or at least involve at least one of execution of at least one macro, execution of a least one script, and execution of at least one batch download.

Method 700 continues at step 704, with the computing system storing at least a subset of the received loan-profile data records in a manner that is organized at least in part according to at least one loan characteristic included in the respective received loan-profile data records. In at least one embodiment, step 704 involves at least one loan-profile data record being manually stored in that manner. In at least one embodiment, step 704 involves at least one loan-profile data record being stored in that manner in at least one automated manner, which as examples could take the form of or at least involve at least one of file-type conversion, batch file-type conversion, optical character recognition (OCR), and parsing.

In at least one embodiment, the one or more loan characteristics according to which the stored loan-profile data records are at least in part organized includes one or more of original lender, original borrower, original loan amount, transaction type, transaction date, and agent bank. In at least one embodiment, the manner in which these records are organized takes the form of or at least includes a file-naming convention where the file names reflects at least one such loan characteristic. In at least one embodiment, the manner in which these records are organized takes the form of or at least includes a folder structure wherein the folder contents are determined at least in part by said contents having in common at least one such characteristic. In at least one such embodiment, the referenced folder structure comprises at least two different hierarchical levels of organization respectively organized by two different such characteristics.

Method 700 continues at step 706, with the computing system receiving SPV-modeling data records from at least one SPV-modeling data source. In at least one embodiment, at least one of the received SPV-modeling data records pertains to an SPV selected from the group consisting of a CLO, a CDO, and a CMO. In at least one embodiment, receiving SPV-modeling data records comprises receiving updated data feeds and responsively updating at least one stored association.

Method 700 continues at step 708, with the computing system mining at least a subset of the received SPV-modeling data records to extract therefrom and store associations between respective original loans and respective downstream pieces thereof. The associations include identifications of respective downstream lending institutions currently holding respective downstream pieces of respective original loans.

Method 700 continues at step 710, with the computing system presenting via the at least one user interface (i) access to the stored subset of received loan-profile data records according to the manner in which the subset is stored and (ii) access to the stored associations between respective original loans and respective downstream pieces thereof. The access to the loan-profile data records and the access to the stored associations are correlated with one another by at least one loan characteristic.

In at least one embodiment, the computing system includes a target tracker, which itself includes a target data store and a target user interface. The target data store includes target-company profile records and the stored loan-profile records, and the target user interface provides access to said target-company profile records and stored loan-profile records.

In at least one embodiment, the computing system includes a sourcing tracker, which itself includes a sourcing data store and a sourcing user interface. The sourcing data store includes at least one of contact information, communication-history information, and planned-communication information for one or more contacts at one or more downstream lending institutions. And the sourcing user interface provides access to this information for the one or more contacts, and further provides correlated access between (i) the information regarding the one or more contacts and (ii) the stored associations pertaining respectively to the downstream lending institutions respectively associated with said contacts.

In at least one embodiment, the computing system provides via the at least one user interface a single display comprising respective points of access to respective cross-referenced displays of stored data, where these cross-referenced displays include displays that respectively pertain to target companies, target loans, target pieces of target loans, and a distressed-loan universe. In at least one embodiment, the cross-referenced displays further include at least one of a display that pertains to transaction due diligence, a display that pertains to research and reporting, and a display that pertains to transaction profile data. In at least one embodiment, the system provides all of those cross-referenced displays mentioned in the preceding sentence, arranged on the at least one user interface in a visual sequence that parallels a chronological sequence of a control-investing transaction. And in at least one embodiment, the computing system includes a portfolio-company-reporting function.

Figure 8:
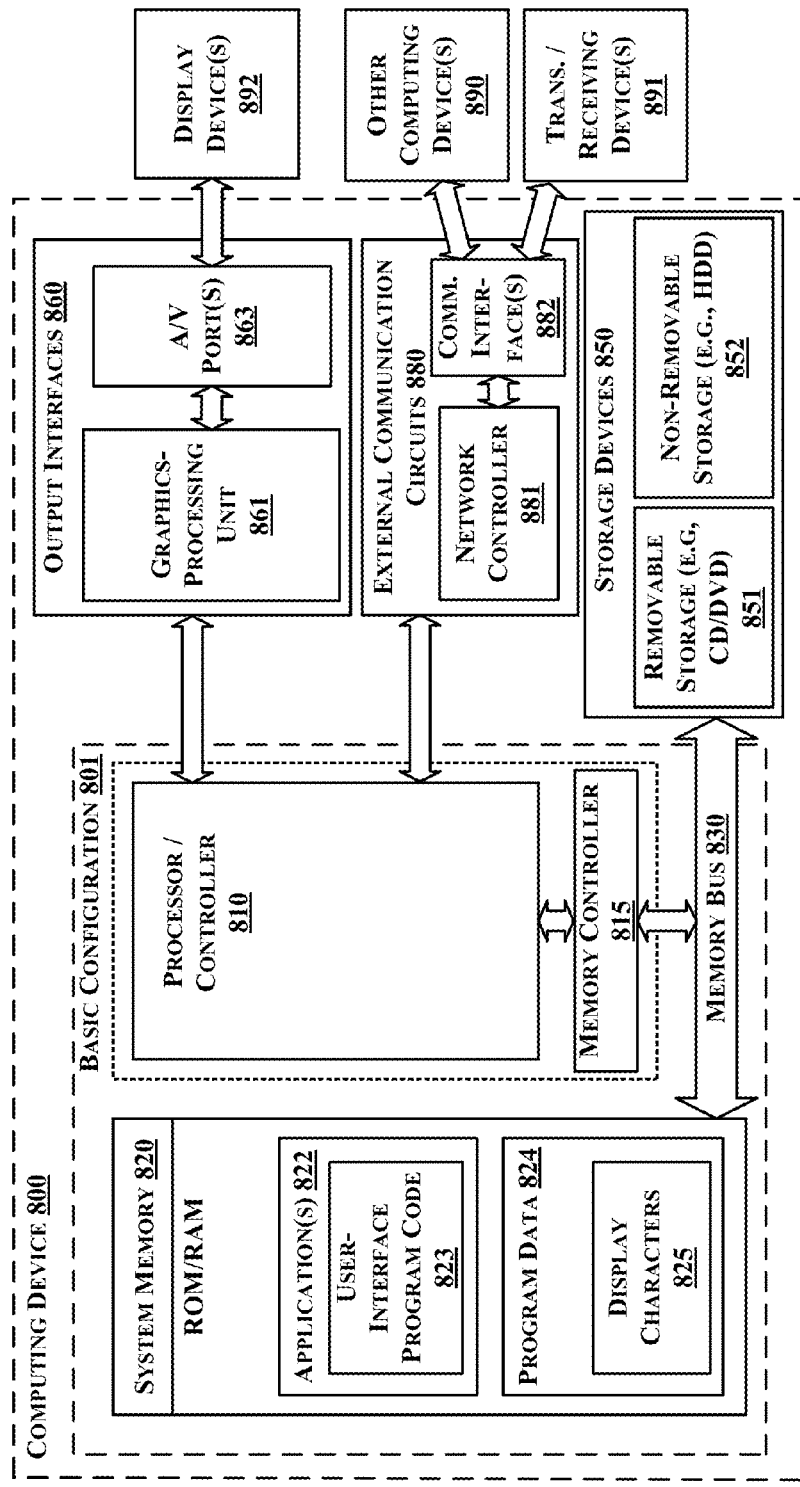
FIG. 8 is a simplified block diagram of a computing device that may be used in accordance with at least one embodiment.

FIG. 8 is a simplified block diagram of a computing device 800 that may be used in accordance with at least one embodiment. The computing device 800 may, in accordance with one or more embodiments, be or include a laptop computer, a tablet computer, a desktop computer, a personal computer, a mobile device, a mobile phone, a personal digital assistant (PDA) and/or one or more other types of computing devices that may be deemed suitable for particular implementations.

In a basic configuration 801, computing device 800 may include one or more processors and/or controllers shown in FIG. 8 as processor/controller 810 and system memory 820. A memory bus 830 can be used for communicating between the processor/controller 810 and the system memory 820. Depending on the desired configuration, processor/controller 810 can be of any type including but not limited to a microprocessor (µP), a microcontroller (µC), a digital signal processor (DSP), or any combination thereof. A memory controller 815 can also be used with the processor/controller 810, though the memory controller 815 can be an internal part of the processor/controller 810.

Depending on the desired configuration, the system memory 820 can be of any type including but not limited to volatile memory (such as RAM), non-volatile memory (such as ROM, flash memory, etc.) or any combination thereof. System memory 820 may have stored thereon one or more applications 822 and program data 824. Application(s) 822 may include program code such as user-interface program code 823. Other process descriptions, steps, or blocks in flow or message diagrams in the present disclosure should be understood as potentially representing modules, segments, or portions of code which include one or more executable instructions stored in application memory 822 for implementing specific logical functions or steps in the process, and alternate implementations are included within the scope of the disclosed embodiments of the methods in which functions may be executed out of order from that shown or discussed, including substantially concurrently or in reverse order, depending on the functionality involved, as would be understood by those of ordinary skill in the art.

Program data 824 may include, among other things, display characters 825 that correspond to characters displayed on the user interface implemented via user-interface program code 823, and that may be included in display data sent to one or more display devices 892. In some embodiments, applications stored in application memory 822 can be arranged to operate with program data 824. Computing device 800 can have additional features and/or functionality, and additional interfaces to facilitate communications between the basic configuration 801 and any devices and interfaces. For example, the data storage devices 850 can be removable storage devices 851, non-removable storage devices 852, or a combination thereof. Examples of removable storage and non-removable storage devices include magnetic disk devices such as flexible disk drives and hard-disk drives (HDD), optical disk drives such as compact disk (CD) drives or digital versatile (or video) disk (DVD) drives, solid state drives (SSD), tape drives, etc.

System memory 820, removable storage media for use with removable storage devices 851, and non-removable storage 852 are all examples of computer storage media, which can include but is not limited to RAM, ROM, EEPROM, flash memory, other memory technology, CD-ROM, DVD, other optical storage, magnetic cassettes, magnetic tape, magnetic disk storage, other magnetic storage devices, and/or any other medium which can be used to store information that can then be accessed by computing device 800.

In general, computer storage media can include volatile and nonvolatile, removable and non-removable media implemented in any method or technology for storage of information, such as computer-readable instructions, data structures, program modules, or other data. One or more embodiments may be implemented at least in part in the form of computer program instructions encoded on a non-transitory (e.g., tangible) computer-readable storage medium in a machine-readable-and-machine-executable format.

Computing device 800 can also include output interfaces 860 that may include a graphics-processing unit 861 that can be configured to communicate with various external devices such as display devices 892 (which may include, for example, a computer screen) or speakers via one or more A/V ports 863. External communication circuits 880 may include a network controller 881, which can be arranged to facilitate communications with one or more other computing devices 890 and/or one or more transmitting and/or receiving devices 891.

Figure 9:
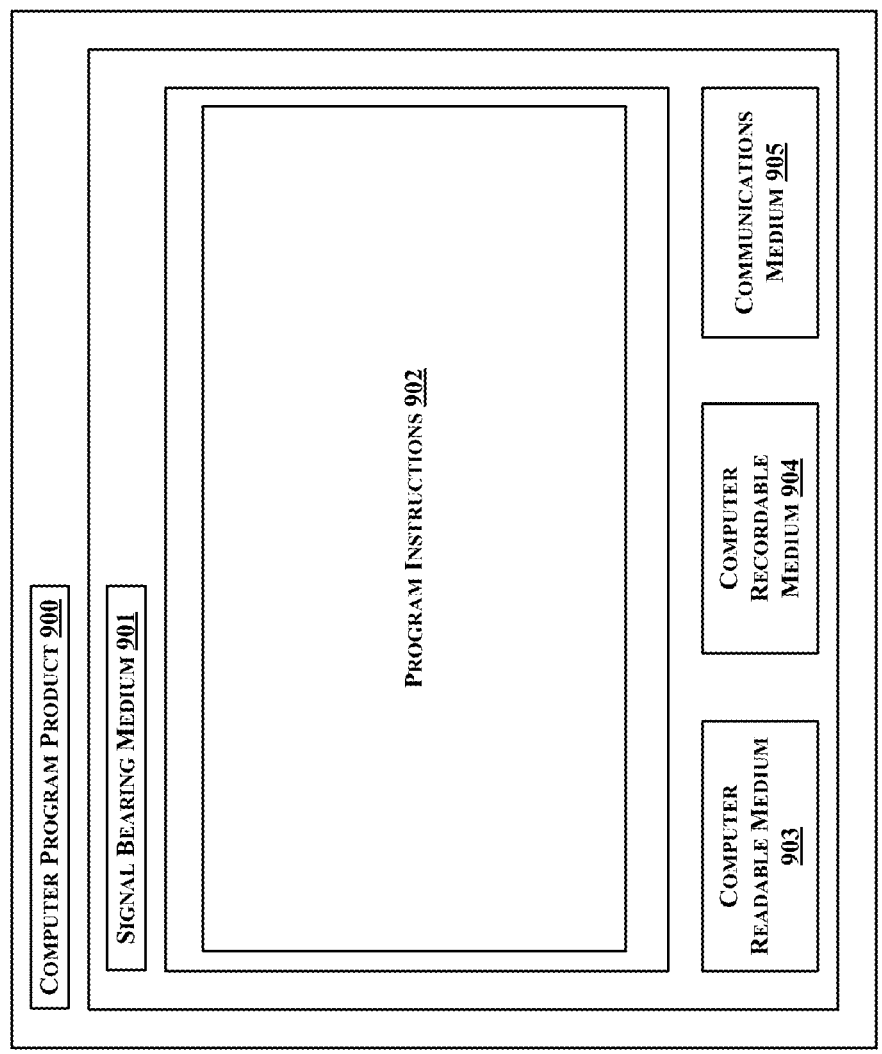
FIG. 9 is a simplified schematic diagram of a computer program product in accordance with at least one embodiment.

FIG. 9 is a simplified schematic diagram illustrating a conceptual partial view of an example computer program product 900 on which may be stored a computer program for executing a computer process on a computing device, arranged according to one or more embodiments described herein. In at least one embodiment, the example computer program product 900 comprises a signal-bearing medium 901 that has stored thereon one or more program instructions 902 that, when executed by at least one processor, operate to carry out one or more of the functions described herein.

In at least one embodiment, the signal-bearing medium 901 encompasses a tangible computer-readable medium 903 such as but not limited to a hard disk drive, a CD, a DVD, a digital tape, memory, etc. In some implementations, the signal-bearing medium 901 encompasses a computer-recordable medium 904 such as but not limited to memory, read/write (R/W) CDs, R/W DVDs, etc. In some implementations, the signal-bearing medium 901 encompasses a communications medium 905 such as but not limited to a digital communication medium and/or an analog communication medium (e.g., a fiber-optic cable, a waveguide, a wired communications link, a wireless communication link, etc.).

Figure 10:
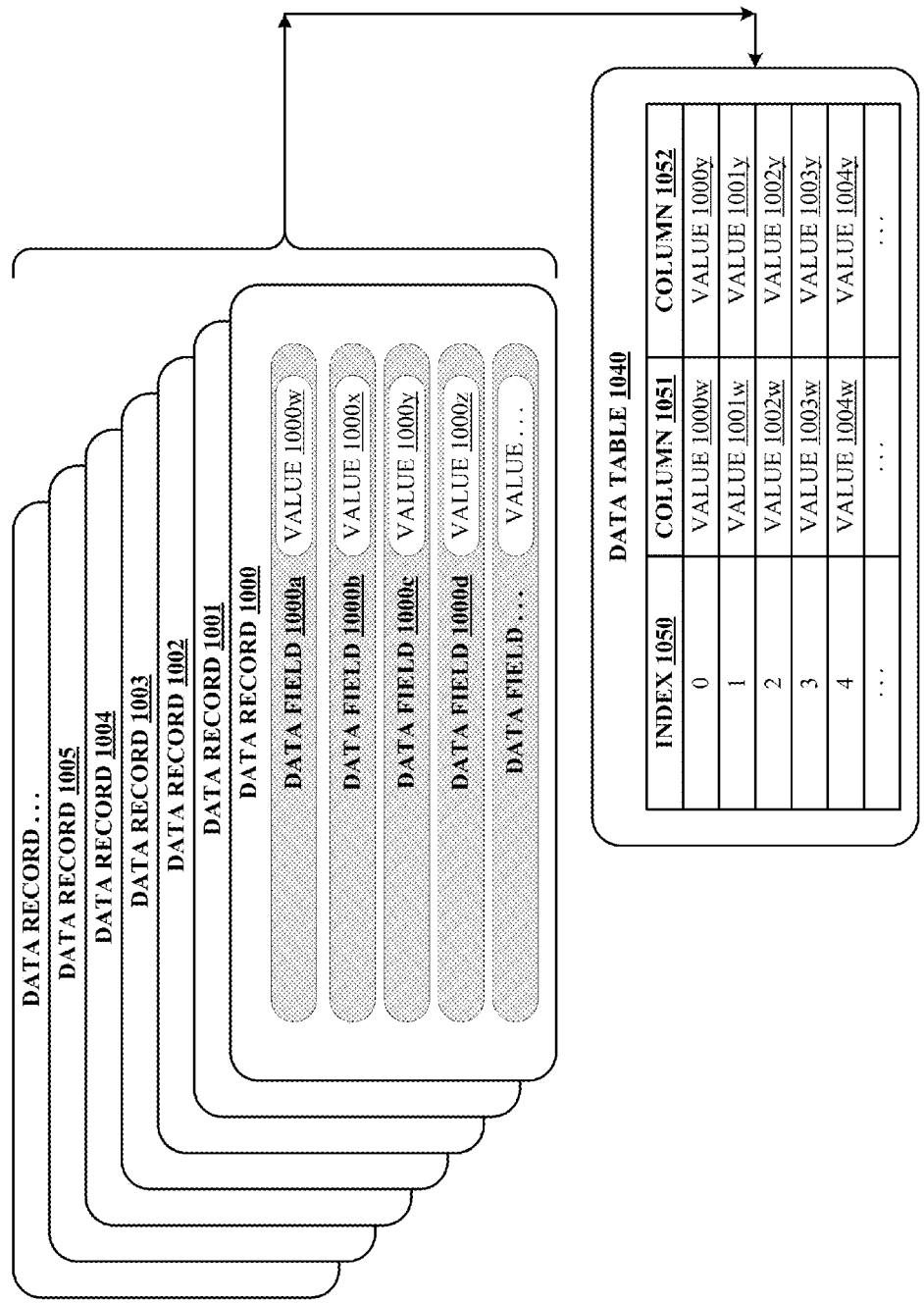
FIG. 10 is a simplified block diagram illustrating an example of data mining in accordance with at least one embodiment.

FIG. 10 is a simplified block diagram illustrating an example of data mining in accordance with at least one embodiment. And it should be noted that FIG. 10 is purposefully generalized; it does not depict any particular example of mining any particular data from any particular, e.g., data stream. More generally, FIG. 10 depicts data mining so as to extract one or more data values from one or more data streams, data feeds, sets of data records, data stores, etc. The phrasing of FIG. 10 in terms of records, fields, values, table, indices, columns, etc. is used to aid the reader by way of explanation, and is not used by way of limitation.

For illustration, FIG. 10 shows a set of data records numbered 1000-1005. And the next record is shown including the " . . . " character, indicating with each instance of its use that the associated set of elements could include any number of elements, and that the number actually depicted is just an example. And these records could represent all or part of one or more data streams, data feeds, sets of downloaded records, sets of records from a CD-ROM, and/or any other source of data (i.e., data source) that is suitable for a given implementation.

Data record 1000 is shown as including data fields 1000a-1000d as an example. In this example, each record includes a corresponding set of data fields (e.g., 1001a-1000d, etc.), though this is for ease of explanation and is not necessarily the case in every implementation. And as indicated by the " . . . ," any number of data fields could be present in each record. And each data field could include one or more values of any type of data, such as strings, characters, integers, Boolean variables, floating-point numbers, programming objects, etc. For ease of explanation, each field is depicted in FIG. 10 as including a single value of unspecified data type. Thus, field 1000a is shown as containing value 1000w, and so on.

The brace and the arrows that extend between the set of records 1000-1005 and the data table 1040 generically represents the data-mining function, while the data table 1040 itself generally illustrates an example result of the data mining at a snapshot in time. As is known in the programming arts, data mining typically involves parsing received data to identify and extract one or more data values therefrom. FIG. 10 shows an example where the "w" and "y" values of each received record are stored as an ordered pair in connection with an integral index.

In at least one embodiment, the records represent at least part of an SPV-modeling data feed from an SPV modeler such as Intex®, and the extraction-result data table 1040 might, in a given row, have an index, and/or perhaps a macro-level identifier (where any identifier could be a name, number, a combination thereof, etc.) of a loan (and perhaps also an identifier of the borrower). And each row might further have an identifier of a given piece or set of pieces of that loan, as well as an identifier of the downstream lending institution that currently holds that piece or set of pieces. Thus, a given record from such a data feed might identify the borrower, the loan at the macro level, one or more pieces of the loan, and the respective downstream lending institution that is currently holding that piece or pieces. And the given record likely also includes one or more other data values, such as one or more risk/reward indicators and/or one or more other values of any other type, though the present system mines for storage and presentation only a subset of the data that is received, as described herein.

While various aspects and embodiments have been disclosed herein, others will be apparent to those skilled in the art. The aspects and embodiments disclosed herein are for illustration and are not intended to be limiting, as the true scope and spirit of the present systems and methods is defined by the following claims, along with the full scope of equivalents to which those claims are entitled. It is also to be understood that the terminology used herein is chosen solely for the purpose of describing particular embodiments, and is not intended to be limiting.

The invention claimed is:

1. A computing system for facilitating the identification, sourcing, and acquisition of distressed debt, the computing system comprising:
   at least one user interface;
   at least one communication interface;
   at least one processor; and
   data storage having stored thereon instructions executable by the at least one processor for carrying out a set of functions, the set of functions including:
      the computing system receiving loan-profile data records from at least one loan-profile data source, wherein each received loan-profile data record is associated with an original loan from a respective original lender to a respective original borrower for a respective original loan amount, and wherein each received loan-profile data record includes data that reflects one or more loan characteristics of the loan associated with that loan-profile data record;
      the computing system storing at least a subset of the received loan-profile data records in a manner that is organized at least according to at least one loan characteristic included in the respective received loan-profile data records;
      the computing system receiving special-purpose-vehicle-(SPV)-modeling data records from at least one SPV-modeling data source;
      the computing system mining at least a subset of the received SPV-modeling data records to extract therefrom and store associations between respective original loans and respective downstream pieces of said respective original loans, wherein the associations include identifications of respective downstream lending institutions currently holding said respective downstream pieces of said respective original loans;
      the computing system presenting via the at least one user interface (i) access to the stored subset of received loan-profile data records according to the manner in which the subset is stored and (ii) access to the stored associations between respective original loans and respective downstream pieces of said respective original loans, wherein said access to the loan-profile data records and said access to the stored associations are correlated with one another by at least one loan characteristic; and
      the computing system providing a target tracker, wherein the target tracker comprises a target data store and a target user interface, wherein the target data store comprises target-company profile records and the stored loan-profile records, and wherein the target user interface provides access to said target-company profile records and stored loan-profile records.

2. The computing system of claim 1, wherein the at least one user interface comprises at least one visual display.

3. The computing system of claim 1, wherein receiving loan-profile data records from at least one loan-profile data source comprises at least one of (i) at least one loan-profile data record being manually downloaded and (ii) at least one loan-profile data record being downloaded in at least one automated manner.

4. The computing system of claim 3, wherein said at least one automated manner involves at least one of execution of at least one macro, execution of a least one script, and execution of at least one batch download.

5. The computing system of claim 1, wherein storing at least the subset of the received loan-profile data records in the manner that is organized at least according to at least one loan characteristic included in the respective received loan-profile data records comprises at least one of (i) at least one loan-profile data record being manually stored in that manner and (ii) at least one loan-profile data record being stored in that manner in at least one automated manner.

6. The computing system of claim 5, wherein said at least one automated manner involves at least one of file-type conversion, batch file-type conversion, optical character recognition (OCR), and parsing.

7. The computing system of claim 1, wherein the at least one loan characteristic included in the respective received loan-profile data records includes one or more of original lender, original borrower, original loan amount, transaction type, transaction date, and agent bank.

8. The computing system of claim 1, wherein the manner in which the respective received loan-profile data records are organized comprises at least one of (i) a file-naming convention wherein the file names reflects at least one such loan characteristic and (ii) a folder structure wherein the folder contents are determined at least in part by said contents having in common at least one such loan characteristic.

9. The computing system of claim 8, wherein said folder structure comprises at least two different hierarchical levels of organization respectively organized by two different such loan characteristics.

10. The computing system of claim 1, wherein at least one of the received SPV-modeling data records pertains to an SPV selected from the group consisting of a collateralized loan obligation (CLO), a collateralized debt obligation (CDO), and a collateralized mortgage obligation (CMO).

11. The computing system of claim 1, wherein receiving SPV-modeling data records comprises receiving updated data feeds and responsively updating at least one stored association.

12. The computing system of claim 1, further comprising a sourcing tracker, wherein the sourcing tracker comprises a sourcing data store and a sourcing user interface, wherein the sourcing data store comprises and the sourcing user interface provides access to at least one of contact information, communication-history information, and planned-communication information for one or more contacts at one or more downstream lending institutions, wherein the sourcing user-interface provides said access in a manner that is correlated with the stored associations that pertain respectively to the downstream lending institutions respectively associated with said contacts.

13. The computing system of claim 1, further comprising providing via the at least one user interface a single display comprising respective points of access to respective cross-referenced displays of stored data, wherein the cross-referenced displays include displays that respectively pertain to target companies, target loans, target pieces of target loans, and a distressed-loan universe.

14. The computing system of claim 13, wherein the cross-referenced displays further include at least one of a display that pertains to transaction due diligence, a display that pertains to research and reporting, and a display that pertains to transaction profile data.

15. The computing system of claim 13, wherein the cross-referenced displays further include a display that pertains to transaction due diligence, a display that pertains to research and reporting, and a display that pertains to transaction profile data.

16. The computing system of claim 15, wherein the cross-referenced displays are arranged on the at least one user interface in a visual sequence that parallels a chronological sequence of a control-investing transaction.

17. The computing system of claim 1, further comprising a portfolio-company-reporting function.

18. A method facilitating the identification, sourcing, and acquisition of distressed debt, the method carried out by a computing system comprising at least one user interface, at least one communication interface, at least one processor, and data storage having stored thereon instructions executable by the at least one processor for carrying out the method, the method comprising:

the computing system receiving loan-profile data records from at least one loan-profile data source, wherein each received loan-profile data record is associated with an original loan from a respective original lender to a respective original borrower for a respective original loan amount, and wherein each received loan-profile data record includes data that reflects one or more loan characteristics of the loan associated with that loan-profile data record;

the computing system storing at least a subset of the received loan-profile data records in a manner that is organized at least according to at least one loan characteristic included in the respective received loan-profile data records;

the computing system receiving special-purpose-vehicle- (SPV)-modeling data records from at least one SPV-modeling data source;

the computing system mining at least a subset of the received SPV-modeling data records to extract therefrom and store associations between respective original loans and respective downstream pieces of said respective original loans, wherein the associations include identifications of respective downstream lending institutions currently holding said respective downstream pieces of said respective original loans;

the computing system presenting via the at least one user interface (i) access to the stored subset of received loan-profile data records according to the manner in which the subset is stored and (ii) access to the stored associations between respective original loans and respective downstream pieces of said respective original loans, wherein said access to the loan-profile data records and said access to the stored associations are correlated with one another by at least one loan characteristic; and the computing system providing a target tracker, wherein the target tracker comprises a target data store and a target user interface, wherein the target data store comprises target-company profile records and the stored loan-profile records, and wherein the target user interface provides access to said target-company profile records and stored loan-profile records.

19. The method of claim 18, wherein the at least one user interface comprises at least one visual display.

20. The method of claim 18, wherein receiving loan-profile data records from at least one loan-profile data source comprises at least one of (i) at least one loan-profile data record being manually downloaded and (ii) at least one loan-profile data record being downloaded in at least one automated manner.

21. The method of claim 20, wherein said at least one automated manner involves at least one of execution of at least one macro, execution of a least one script, and execution of at least one batch download.

22. The method of claim 18, wherein storing at least the subset of the received loan-profile data records in the manner that is organized at least according to at least one loan characteristic included in the respective received loan-profile data records comprises at least one of (i) at least one loan-profile data record being manually stored in that manner and (ii) at least one loan-profile data record being stored in that manner in at least one automated manner.

23. The method of claim 22, wherein said at least one automated manner involves at least one of file-type conversion, batch file-type conversion, optical character recognition (OCR), and parsing.

24. The method of claim 18, wherein the at least one loan characteristic included in the respective received loan-profile data records includes one or more of original lender, original borrower, original loan amount, transaction type, transaction date, and agent bank.

25. The method of claim 18, wherein the manner in which the respective received loan-profile data records are organized comprises at least one of (i) a file-naming convention wherein the file names reflects at least one such loan characteristic and (ii) a folder structure wherein the folder contents are determined at least in part by said contents having in common at least one such loan characteristic.

26. The method of claim 25, wherein said folder structure comprises at least two different hierarchical levels of organization respectively organized by two different such loan characteristics.

27. The method of claim 18, wherein at least one of the received SPV-modeling data records pertains to an SPV selected from the group consisting of a collateralized loan obligation (CLO), a collateralized debt obligation (CDO), and a collateralized mortgage obligation (CMO).

28. The method of claim 18, wherein receiving SPV-modeling data records comprises receiving updated data feeds and responsively updating at least one stored association.

29. The method of claim 18, further comprising the computing system providing a sourcing tracker, wherein the sourcing tracker comprises a sourcing data store and a sourcing user interface, wherein the sourcing data store comprises and the sourcing user interface provides access to at least one of contact information, communication-history information, and planned-communication information for one or more contacts at one or more downstream lending institutions, wherein the sourcing user-interface provides said access in a manner that is correlated with the stored associations that pertain respectively to the downstream lending institutions respectively associated with said contacts.

30. The method of claim 18, further comprising the computing system providing via the at least one user interface a single display comprising respective points of access to respective cross-referenced displays of stored data, wherein the cross-referenced displays include displays that respectively pertain to target companies, target loans, target pieces of target loans, and a distressed-loan universe.

31. The method of claim 30, wherein the cross-referenced displays further include at least one of a display that pertains to transaction due diligence, a display that pertains to research and reporting, and a display that pertains to transaction profile data.

32. The method of claim 30, wherein the cross-referenced displays further include a display that pertains to transaction due diligence, a display that pertains to research and reporting, and a display that pertains to transaction profile data.

33. The method of claim 32, wherein the cross-referenced displays are arranged on the at least one user interface in a visual sequence that parallels a chronological sequence of a control-investing transaction.

34. The method of claim 18, further comprising the computing system providing a portfolio-company-reporting function.

\* \* \* \* \*